United States Patent [19]

Brantingham

[11] 3,953,719

[45] Apr. 27, 1976

[54] LATCHED DECODER FOR DIGIT OUTPUTS TO AN ELECTRONIC DIGITAL CALCULATOR DISPLAY

[75] Inventor: George L. Brantingham, Richardson, Tex.

[73] Assignee: Texas Instruments Incorporated, Dallas, Tex.

[22] Filed: Nov. 26, 1974

[21] Appl. No.: 527,508

[52] U.S. Cl. .............................. 235/156; 340/172.5
[51] Int. Cl.[2] ...................... G06F 15/02; G06F 3/14
[58] Field of Search ........................... 235/152, 156; 340/172.5, 324 R

[56] References Cited
UNITED STATES PATENTS

| | | | |
|---|---|---|---|
| 3,364,471 | 1/1968 | Bienhoff et al. ................ | 340/172.5 |
| 3,760,171 | 9/1973 | Wang et al. ........................ | 235/156 |
| 3,781,852 | 12/1973 | White et al. ..................... | 340/324 R |
| 3,812,489 | 5/1974 | Hirano et al. .................... | 340/324 R |
| 3,858,197 | 12/1974 | Shimizu et al. .................. | 340/324 R |

Primary Examiner—Felix D. Gruber
Assistant Examiner—Jerry Smith
Attorney, Agent, or Firm—Harold Levine; Edward J. Connors, Jr.; Stephen S. Sadacca

[57] ABSTRACT

A greatly simplified calculator circuit implemented, for example, utilizing I$^2$L technology, is fabricated on a relatively small semiconductor chip resulting in high yield. A unique feature of such calculator is a latched decoder for multiplexed digit outputs to the display. The latched decoder reduces the circuitry ordinarily utilized to provide the digit outputs to permit fabrication on the smaller chip. The digit outputs are selected one or more at a time by a load output instruction. A selected number of bits of the load output instruction selects the digit.

11 Claims, 14 Drawing Figures

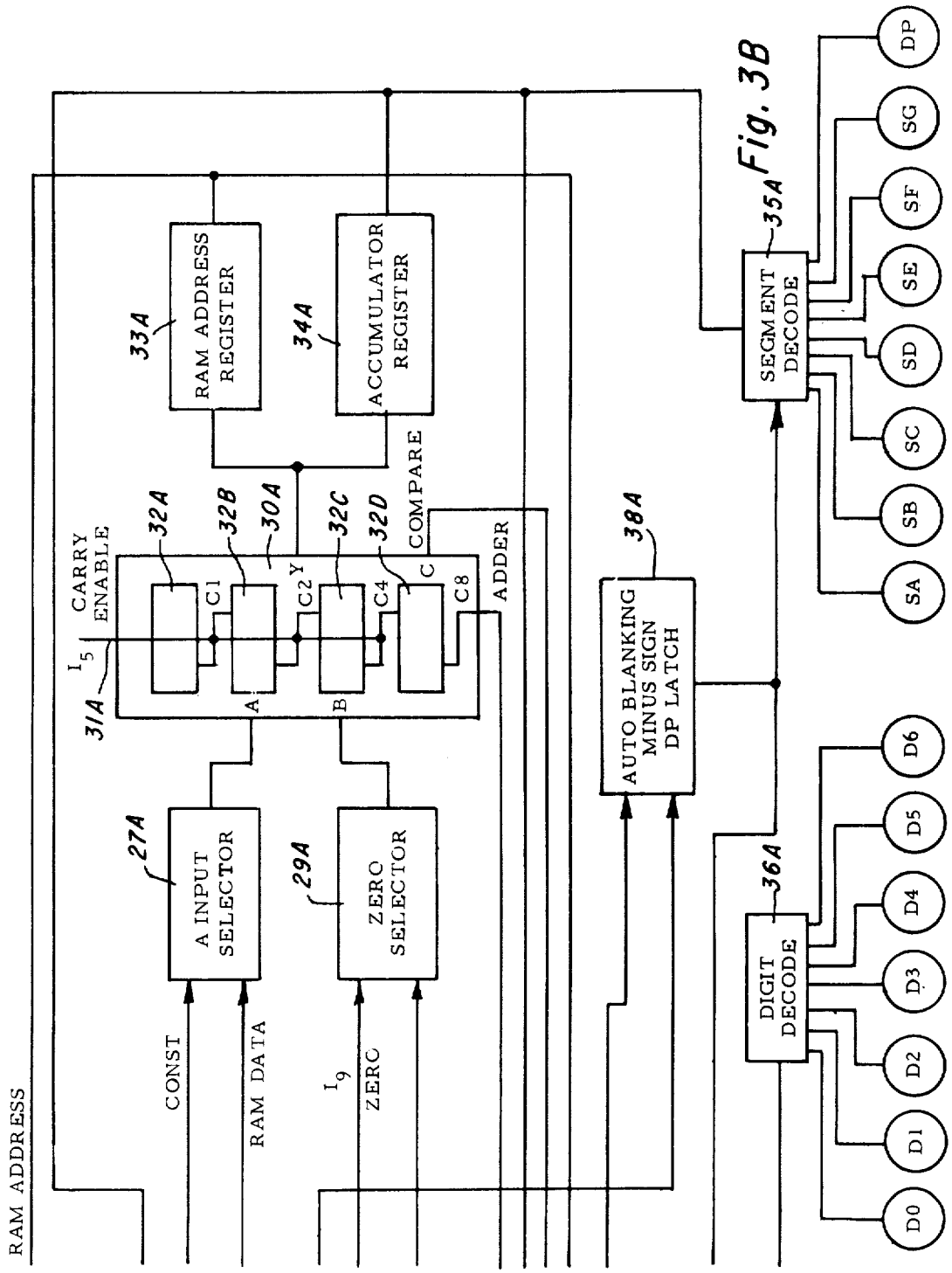

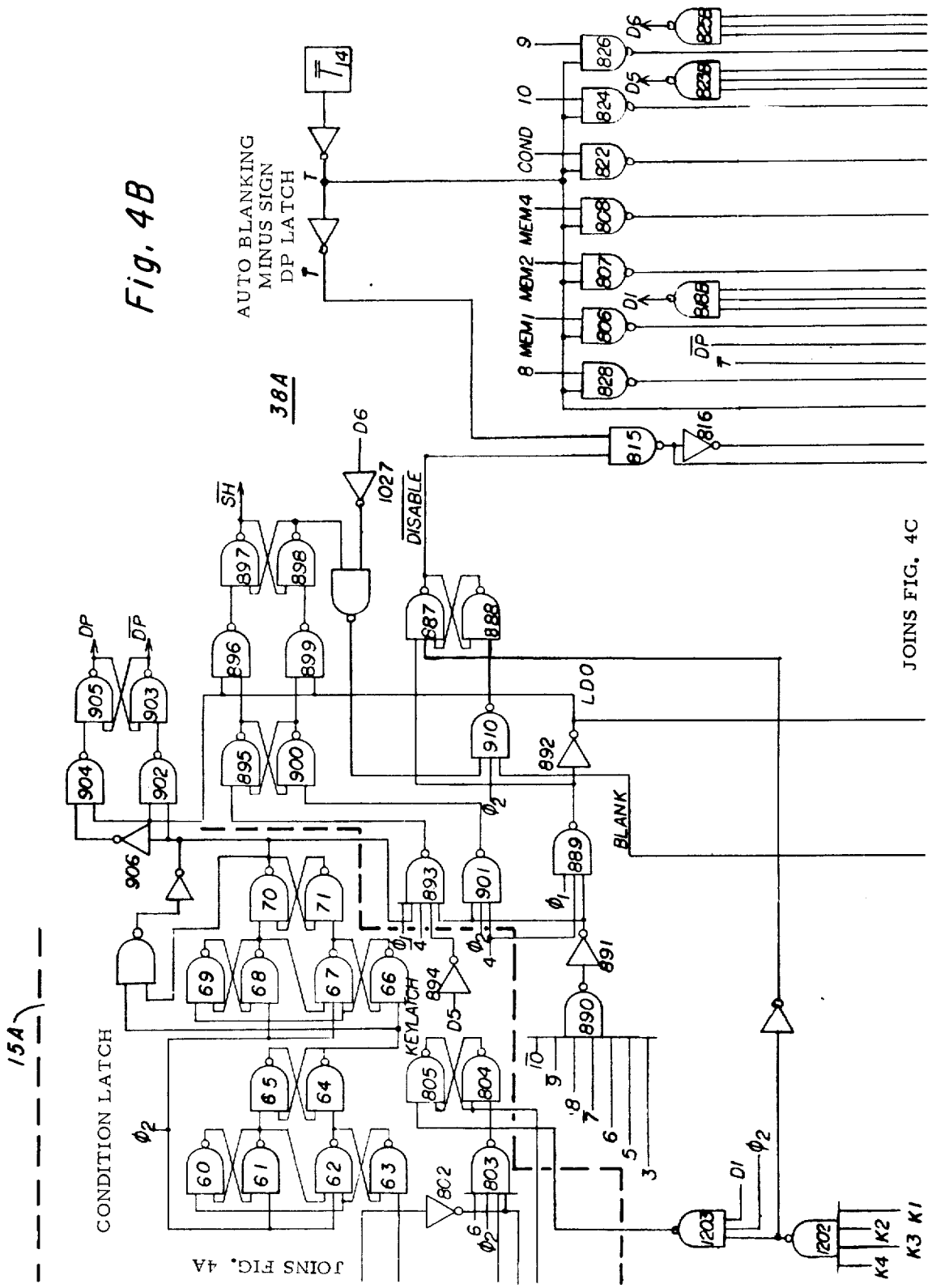

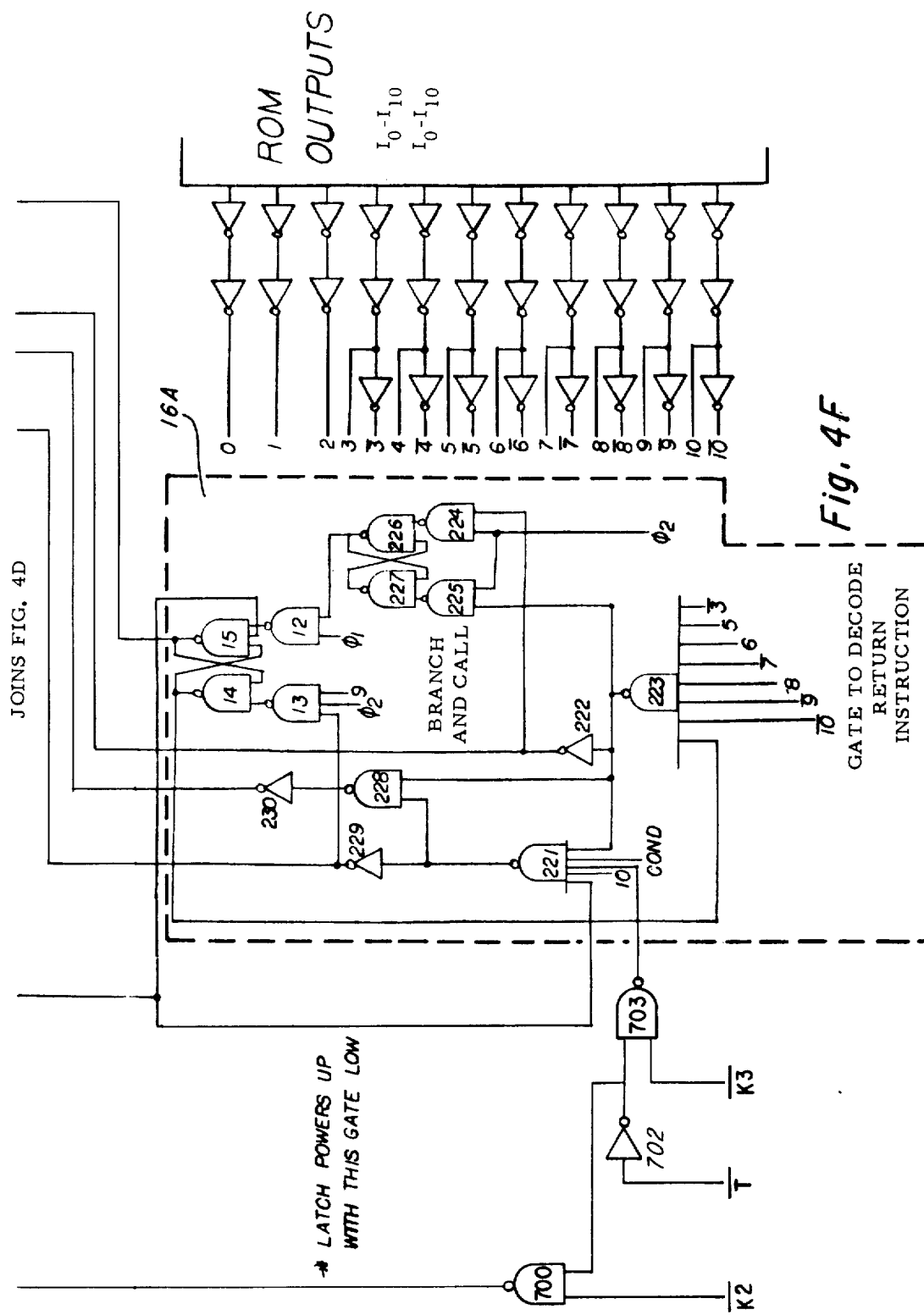

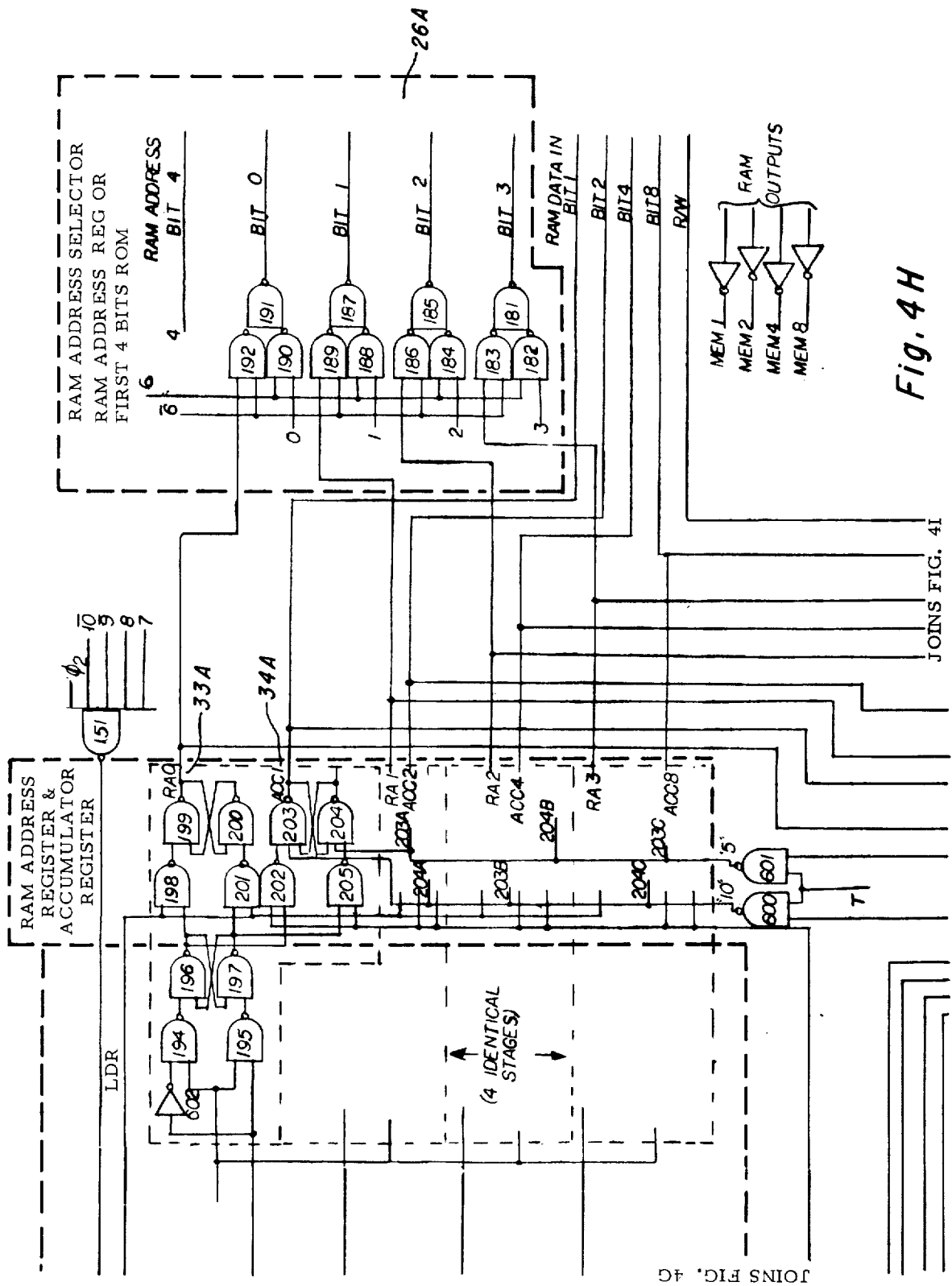

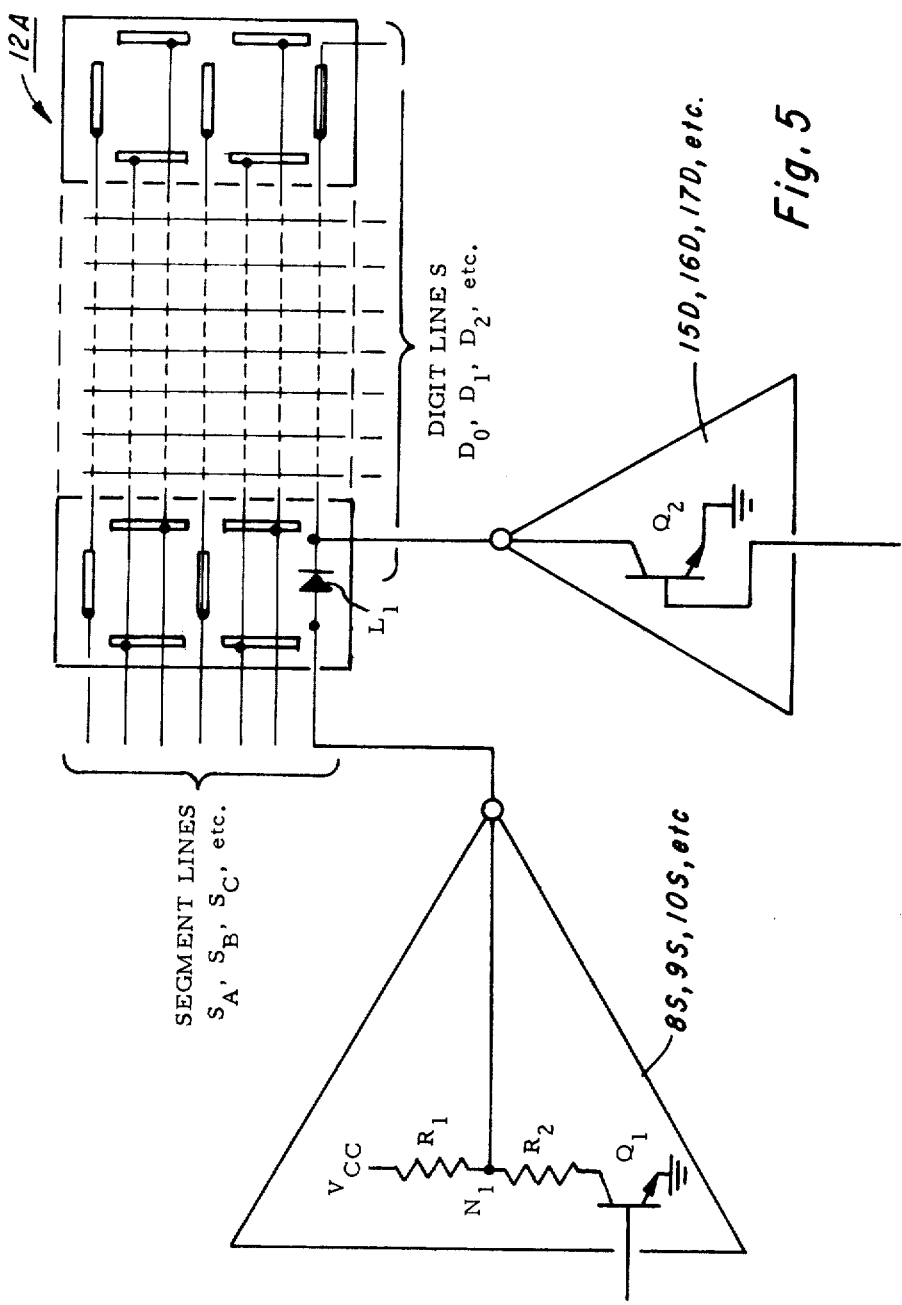

LATCHED DECODER FOR DIGIT OUTPUTS TO AN ELECTRONIC DIGITAL CALCULATOR DISPLAY

This invention relates to calculators and, in particular, to digital electronic calculators fabricated as integrated circuit systems.

Integrated circuit technology has advanced to the stage where an entire calculator system is fabricated on a single chip of semiconductor material including all interface circuitry to an input keyboard, output drivers and display and power supply. These integrated circuit chips have been fabricated, for example, utilizing MOS technology and, more recently, CMOS technology. Reduction of cost in fabricating such integrated calculator systems is directly related to yield. Circuitry embodied in the calculator system of the present invention which is implemented utilizing injection logic I$^2$L technology is directly related to yield in that, by reducing the circuitry required to perform the calculator system function, the chip size is reduced by about 25% and hence the yield increased. The I$^2$L calculator system in addition provides for a lower operating voltage supply of 0.7 volt for the chip and 4.5. for the LED display and provides for the digit drivers to be provided on the single chip.

It is therefore an object of the present invention to provide a greatly simplified calculator circuit on a relatively small semiconductor chip.

It is another object of the invention to provide a semiconductor integrated circuit calculator system in higher yields than presently achieved.

It is still a further object of the invention to provide a bipolar injection logic I$^2$L integrated circuit calculator system.

Still another object of the invention is to provide an improved output digit selection circuit in a greatly simplified digital electronic calculator.

These and other objects are provided in accordance with an embodiment of the invention in which a greatly simplified calculator circuit is implemented, for example, utilizing injection logic I$^2$L technology. The integrated circuit calculator system is fabricated on a single relatively small semiconductor chip resulting in low cost and high yield. A unique feature of such calculator is a latched decoder for multiplexed digit outputs to the display. The latched decoder reduces the circuitry ordinarily utilized to provide the digit outputs to permit fabrication on the smaller chip. The digit outputs are selected one or more at a time by a load output instruction. A selected number of bits of the load output instruction selects the digit.

Still further objects and advantages of the invention will become apparent from the detailed description and claims when read in conjunction with the appended drawings wherein:

Figure 2:
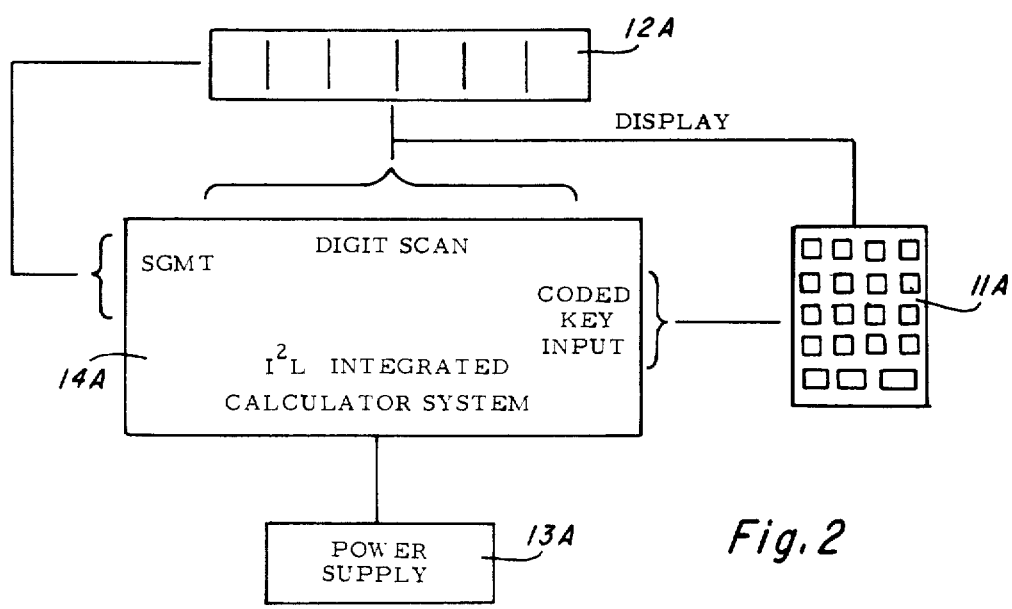
FIG. 2 is a block diagram of a digital electronic calculator system embodying the present invention.
Figure 3A:
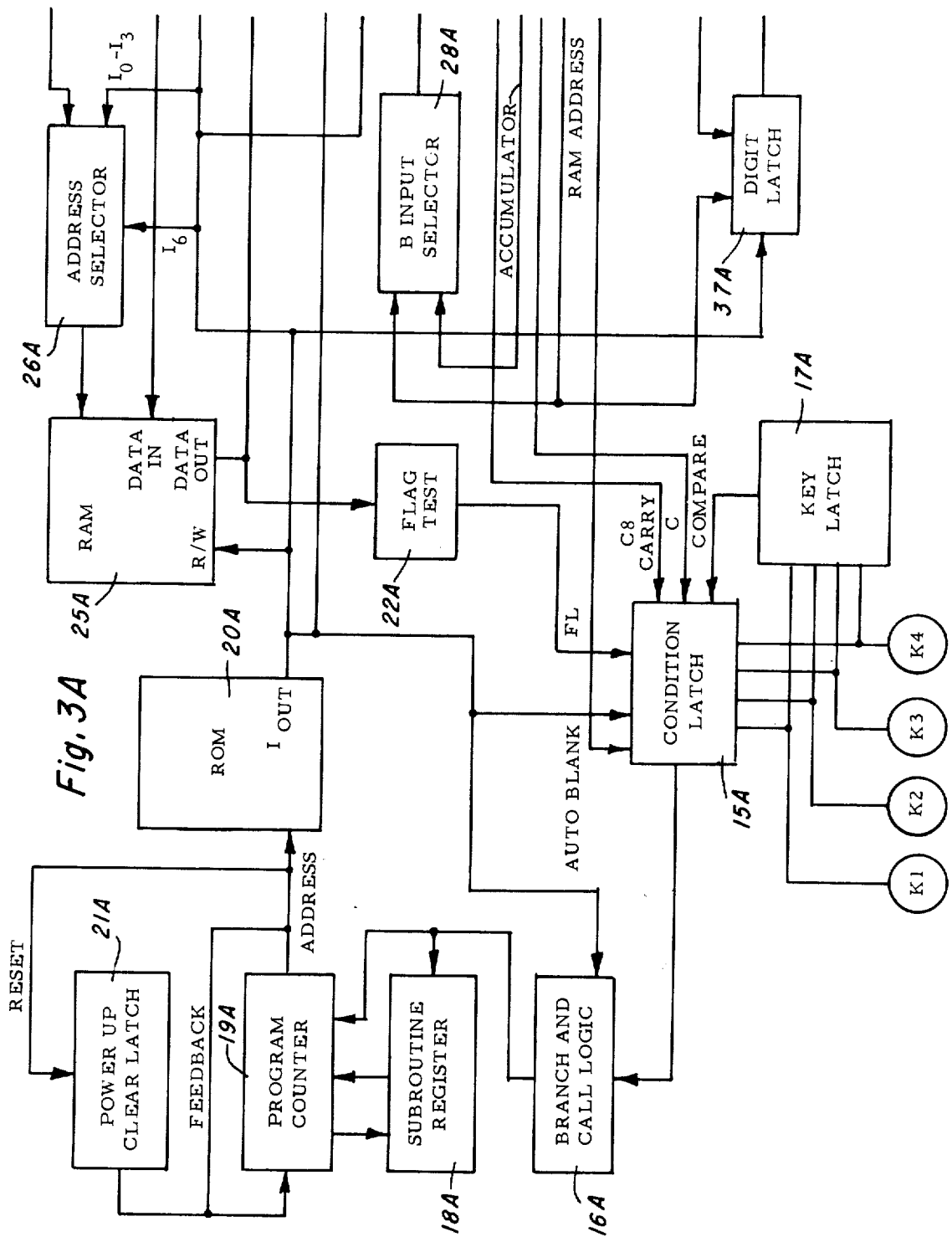

FIGS. 3A and 3B comprise a block diagram of the circuitry comprising the digital electronic calculator of FIG. 2;

FIGS. 4A–I form a detailed logic diagram of the calculator system; and

FIG. 5 is a circuit diagram of the digit and segment drivers employed in an embodiment of the calculator system.

This application discloses subject matter related to that disclosed and claimed in the following U.S. patent applications, all filed herewith and assigned to Texas Instruments Incorporated, the assignee of this invention: Ser. Nos. 527,456, 527,505, 527,506, 527,507, 527,509, and 527,510 all filed on Nov. 26, 1974.

Figure 1:
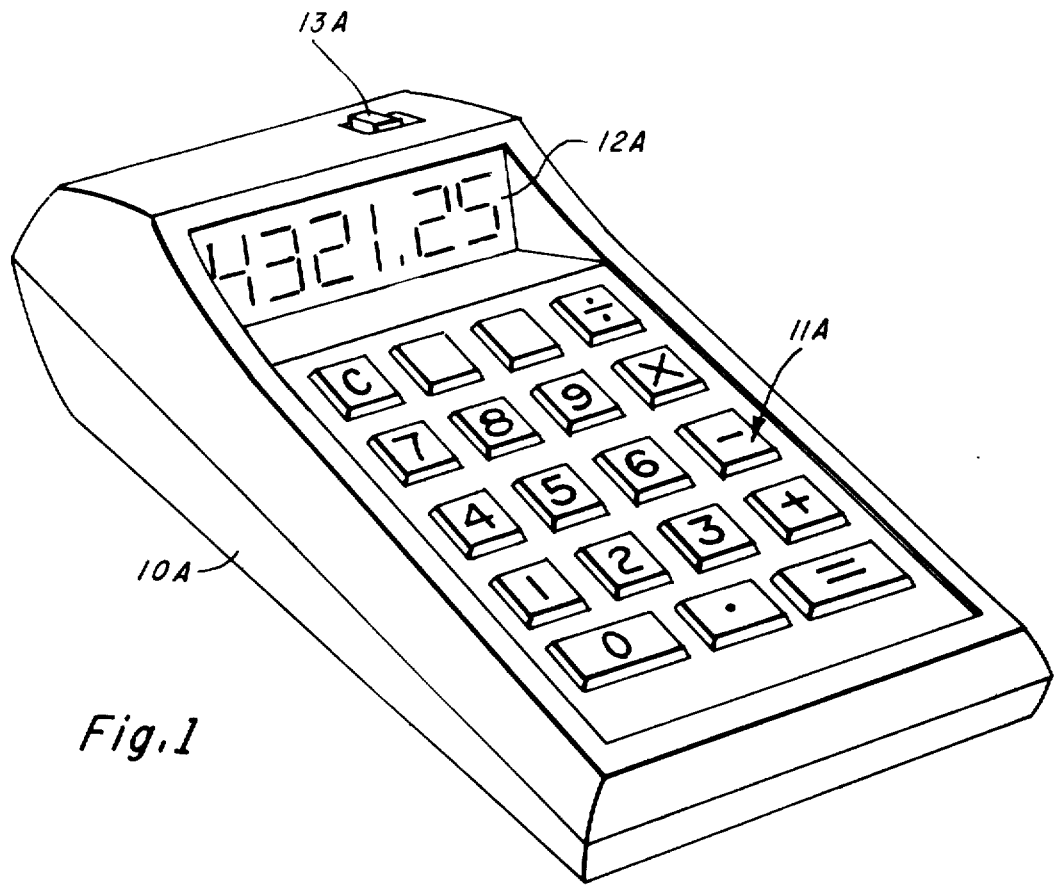
FIG. 1 is a perspective view of a digital electronic calculator employing the present invention.

An example of a calculator employing the present invention is illustrated in FIG. 1. The calculator includes a display 12A which has, for example, seven or nine digit positions for the display of a sign and six or eight numeric characters, respectively, and a keyboard 11A comprised of numeric keys 0–9 and function keys such as plus, minus, multiply, divide, equal, clear, etc. The display 12A and keyboard 11A, as well as a power supply 13A, comprised of batteries, for example, and a switch which couples the batteries to the integrated calculator system as shown in FIG. 2. The integrated calculator system 14A is preferably an I$^2$L integrated circuit system fabricated on a single semiconductor chip of relatively small size. The I$^2$L circuitry requires lower operating voltages than MOS or CMOS circuits. For example, the I$^2$L calculator circuits described herein require a system operating voltage of approximately 0.7 volt and the LED display requires an operating voltage of approximately 4.5 volts.

The calculator system is illustrated in greater detail with reference to the block diagram of FIG. 3 comprised of sections 3A and 3B and in still greater detail in the logic diagram of FIG. 4 comprised of sections 4A–I. Referring then to FIGS. 3 and 4, the calculator system is controlled by a programmed ROM 20A which is coupled to and addressed by program counter 19A. Program counter 19A provides a 9-bit address BIT$_0$–BIT$_8$ to the ROM 20A. The ROM, which in this embodiment, is a 512 word by 11 bit programmed memory with outputs $I_0$–$I_{10}$, in conjunction with the other circuitry of the calculator system, causes the system to operate in a particular manner upon activation of each key or sequence of keys from keyboard 11A. An example of a ROM program for the calculator of FIG. 1 is described in Tables I and II.

A single set of digit lines $D_0$–$D_6$ are utilized to multiplex the display and to scan the keyboard. During the normal display, every digit line $D_0$–$D_6$ is scanned and every key input line $K_1$–$K_4$ is sensed by the key latch 17A. The key latch 17A is comprised of cross-coupled NAND gates 804 and 805 and receives inputs from the key input lines $K_1$–$K_4$ via NAND gates 800, 1202 and 1203. By means of the instruction "test key" which is also fed into the universal condition latch 15A, at the end of every six digit times, the key latch is tested to determine whether a key is being actuated or not.

In order to compensate for key bounce which is typically about 8 milliseconds, the ROM program causes testing of the key latch 17A three consecutive times to insure that a key is actually being actuated. Scanning at, for example, 72 instructions per cycle provides for approximately a 5 millisecond delay. After the key latch 17A has been tested for the third time, and it is determined that the key latch is still latched, the digit lines beginning with $D_6$ are scanned and each K line is individually tested during each digit time until a positive test sets the universal condition latch 15A.

The universal condition latch 15A, comprised of cross-coupled NAND gates 60 and 71, is a unique feature of the calculator system described herein. In prior art calculators, a condition latch was utilized to test the results of a compare operation and/or the carry from the arithmetic unit. The state of the universal condition latch disclosed herein is additionally set by the logical OR of up to four flags in the RAM after a test flag instruction, testing of the RAM for other purposes such as for all 0's, and testing the logical OR of the keyboard input lines $K_0-K_3$ after a test key instruction. These additional inputs provided to the universal condition latch circuitry 15A saves a large number of instructions and contributes to the smaller high yield chip where the calculator system is implemented as an integrated circuit. The universal condition latch will later be referred to with respect to the memory test, flag test, carry output, compare and other operations carried out utilizing the universal condition latch. Referring to FIG. 4, the key input lines $K_1-K_4$ are coupled to the universal condition latch by means of NOT gates 810–813, 56–59, NAND gates 49–52, and NAND gate 53. The output of gate 53 is the logical OR of the key inputs $K_1-K_4$ as controlled by gates 45, 46, 55 and 54.

A positive test determines which of the keys is actuated and the ROM causes the calculator to act according to the actuated key. For example, if a numerical key is being actuated, the condition latch 15A is set (in this particular instance to a "0") and the subroutine register 18A, by means of the branch and call logic 16A coupled to the universal condition latch 15A, cause a branch to the number entry routine and enters the number, corresponding to the actuated key, in the next location in RAM 25A. Where the actuated key is a function key, the condition latch 15A is set to a logical "0" and the subroutine register branches to the particular routine to carry out the function for that actuated key. At digit time $D_1$, the key latch is disabled and reset. As can be seen from the above description, utilization of the universal condition latch 15A and key latch 17A coupled to the key input lines $K_1-K_4$ provides for less ROM lines to decode an actuated key. Utilization of the key latch avoids the necessity of testing each individual K line during each normal cycle. The use of the universal condition latch circuitry avoids the necessity of a programmed logic array which is utilized in prior art calculators in conjunction with additional programming.

The output of the condition latch circuitry 15A is connected to the branch and call logic circuitry 16A. The branch and call logic circuitry 16A includes gate 221 which circuitry determines whether the instruction is a branch or a call instruction and also checks the condition of condition latch 15A to determine whether it is set to a logical "1" or "0". If condition latch 15A is set to a logical "1" the branch or call is executed; if it is set to a logical "0" it is not executed. With condition latch 15A set to a logical "1", gate 897 is forced to input the instruction word ROM address $BIT_0-BIT_8$ which is the new location to branch to or call to into the program counter 19A. The ROM instruction branch or call has two bits $I_9$ and $I_{10}$. A logical "1" in $I_{10}$ determines that the instruction is a branch or a call instruction and a logical "1" in $I_9$, in conjunction with a logical "1" in $I_{10}$, determines that it is a call rather than a branch. If the instruction is a call instruction, then a logical "0" output is provided for gate 221; if it is a branch of a call, a logical "1" at the output of gate 229 and if it is a call, then a logical "1" appears on ROM output line $I_9$ to the input of gate 13 along with the logical "1" from gate 229. Thus, under normal conditions each of the stages of the subroutine register 18A, comprised of a set of gates $B_1-B_4$ for each stage, is loaded with the information contained in a previous program counter stage comprised of a set of gates $A_1-A_4$ for each stage so that the next address from that contained in program counter 19A is normally being stored in subroutine register 18A. When a call occurs, the "load subroutine register" latch, comprised of gates 14 and 15, disables the normal loading of the subroutine register 18A. A branch to the new location occurs and, at the same time, the address of the location that next would have been executed is saved in subroutine register 18A. Thus, in the call mode, the output of gate 14 is coupled to return gate 223. If a return instruction is decoded, then the output of gate 223 goes to a logical "0" and through paths 228 and 230 forces the program counter to be set to the location stored in the subroutine register (via gate $A_6$ on all stages). After that is accomplished, it allows the subroutine register to return to its normal state and begin loading a new address from the program counter 19A.

Every call after the initial call is treated as a branch by the called program in order to save words in the program. Thus, if a call appears within a call, the program returns to the initial return address; this is the same as a branch.

A power up clear latch 21A comprised of cross-coupled NAND gates 17 and 18 are coupled to program counter 19A by means of gate 19 and program counter 19A is coupled back to the power up clear latch 21A through reset NAND gate 16.

The power up clear latch is another unique feature of the disclosed calculator which provides power up clear to reset the calculator to a "0" idle state when the calculator power, provided by power supply 13A, is initially switched on. The power up clear latch 21A disclosed herein is smaller and more reliable than the conventional open loop power up clear circuits which rely entirely on an RC time constant. Elimination of the relatively large capacitor and other associated circuitry contributes to the fabrication of the present system on the smaller semiconductor chip. The power up clear latch comprised of cross-coupled gates 17 and 18 forces the input to the program counter 19A at the output of gate 19 to a logical "1". This causes program counter 19A to increment. When an initial logical state is reached, as indicated by the output of the program counter (in this embodiment all logical 1's), the logical NAND gate 16 coupled to the program counter outputs causes the power up clear latch to be reset.

In the preferred I²L embodiment, the gates A13 and 18 automatically and accurately power up low (logical "0") when the power is turned on. This is accomplished by increasing the size of the injectors of gates A13 and 18 relative to those of 14 and 17. The injectors are made larger by approximately a factor of 4 so that when the power is turned on, the output of gate 18 is a logical "0", the output of gate 19 is a logical "1", and each stage of the program counter will, in turn, change to a logical "1". In other MOS or bipolar embodiments, a realtively small capacitor may be utilized in lieu of the enlarged gates to power the gates up in a particular logic state. When all of the stages of the program counter have changed to logical 1's, gate 16 resets the latch comprised of gates 17 and 18 on the next phase 2 clock pulse and the ROM address is set at an intitial IFF ready to accept the first key entry.

Flag data stored in random access memory 25A is tested by flag test circuitry 22A comprised of NAND gates 40–44. Gates 40–43 provide the logical OR of up to four flags at the output of gate 44 which is utilized to set the condition of universal condition latch 15A after a test flag instruction. NAND gate 44 is coupled to condition latch gates 60–71 by means of gates 47 and 53. Gate 47 is enabled by the decoding of a test flag instruction from ROM outputs to gates 45–47.

Random access memory 25A, in this particular embodiment, is 28 locations by 4 bits addressed by a 5-bit address word provided by means of address selector 26A. The address selector 26A is a unique feature of the calculator system described herein in that both direct and indirect RAM addressing is provided while the number of ROM instructions required for calculator operation is reduced. Thus, the reducing the number of ROM instructions required, the direct and indirect addressing feature contributes to a reduced size of the ROM to permit fabrication on the smaller semiconductor chip. Address selector 26A includes inputs $RA_0$–$RA_3$ from the RAM address register 33A to apply the address stored in the RAM address register to an input of NAND gates 192, 189, 186 and 183. The first four bits of the instruction word from ROM 20A is applied to an input of NAND gates 190, 188, 184 and 182. NAND gates 191, 187, 185 and 181 provide the first four bits of the RAM address as either the contents of the RAM address register 33A or the first four bits of the instruction ($I_0$–$I_3$) contained in the addressed ROM word depending upon the logical state of the seventh ($I_6$) bit of the instruction word contained in the ROM. The state of instruction bit $I_6$ enables either the set of gates 192, 189, 186 and 183 or the set of gates 190, 188, 184 and 182. The fifth bit of the RAM address is always provided by the fifth bit ($I_4$) of the ROM instruction word.

Indirect addressing, that is, enabling RAM address selector 26A to select the address from RAM address register 33A, is particularly useful for register type adds or shifts where it is desired to use the exact same instruction from the ROM but with the address of the RAM incremented by one so as to perform the exact same function to each of a series of digits by incrementing from digit to digit. Thus, for example, a particular operation such as adding digits or shifting may be accomplished by initializing the RAM address to 0, performing the function of digit 0, incrementing the RAM address register and then testing to determine if the RAM address register has reached the last digit (for example, digit 7). If the RAM address register does not contain a 7, the operation is performed on the addressed digit (which in this case would be digit 1). The digit is then incremented, tested for last digit, function performed, incremented, etc. Direct addressing, on the other hand, provides for addressing of the RAM by the permanently stored contents of the first five bits of the ROM instruction. By the use of a single location in the ROM, an operation is performed on eight or nine different digits, for example, providing in essence the equivalent of eight or nine different instructions. By utilization of the indirect addressing feature, the number of ROM instructions is thereby decreased. Additionally, the direct addressing is directly from the ROM without disturbing the contents of RAM address register 33A. A location does not have to be extracted from the ROM and loaded into the RAM address register to indirectly address the RAM 25A by means of RAM address register 33A as is done in some prior art calculators. Testing operations are therefore conveniently carried out by utilization of the direct addressing feature. For example, while the RAM address register is incrementing from digit to digit, the ROM word may be utilized to directly address some known location like the location of the first digit without disturbing the contents of the RAM address register. The contents of the RAM address register does not have to be temporarily stored, reset and restored.

A further example of the use of the direct and indirect addressing feature is illustrated with respect to the multiply routine in which the final digit is checked and a binary one is continually subtracted from the least significant digit in the multiplier and the multiplicand is continually added to the partial product. Once the least significant digit becomes a 0, the partial product multiplicand and multiplier are shifted and the operation continues on the next digit with the adding of the multiplicand to the partial product. Each time the least significant digit of the multiplier is to be checked, the least significant digit is directly addressed without affecting the contents of the RAM address register 33A from which a one is continually being subtracted. In division, a one is continually added to the quotient and, as long as the dividend can be substracted from the divisor, directly puts the result in the accumulator, adds one to it, and returns the result without changing any of the address selects.

The direct and indirect addressing feature is also particularly useful in the display cycle, saving additional ROM memory locations. During the display cycle, in order to light up the decimal point, for example, the condition latch 15A is set to a particular logical level (logical "0") and two instructions take place before a load output. With direct addressing, the digit being scanned is stored in the accumulator, compared to the decimal point value, which value is determined by directly addressing the memory at the decimal point location, and on the next instruction taking the next digit to be displayed in the particular D time by indirectly addressing RAM 25A from the RAM address register 33A and storing the digit in the accumulator. On the next instruction "load output" the correct D time is stored in RAM address register 33A and the correct digit has been loaded in accumulator register 34A.

Figure 4A:
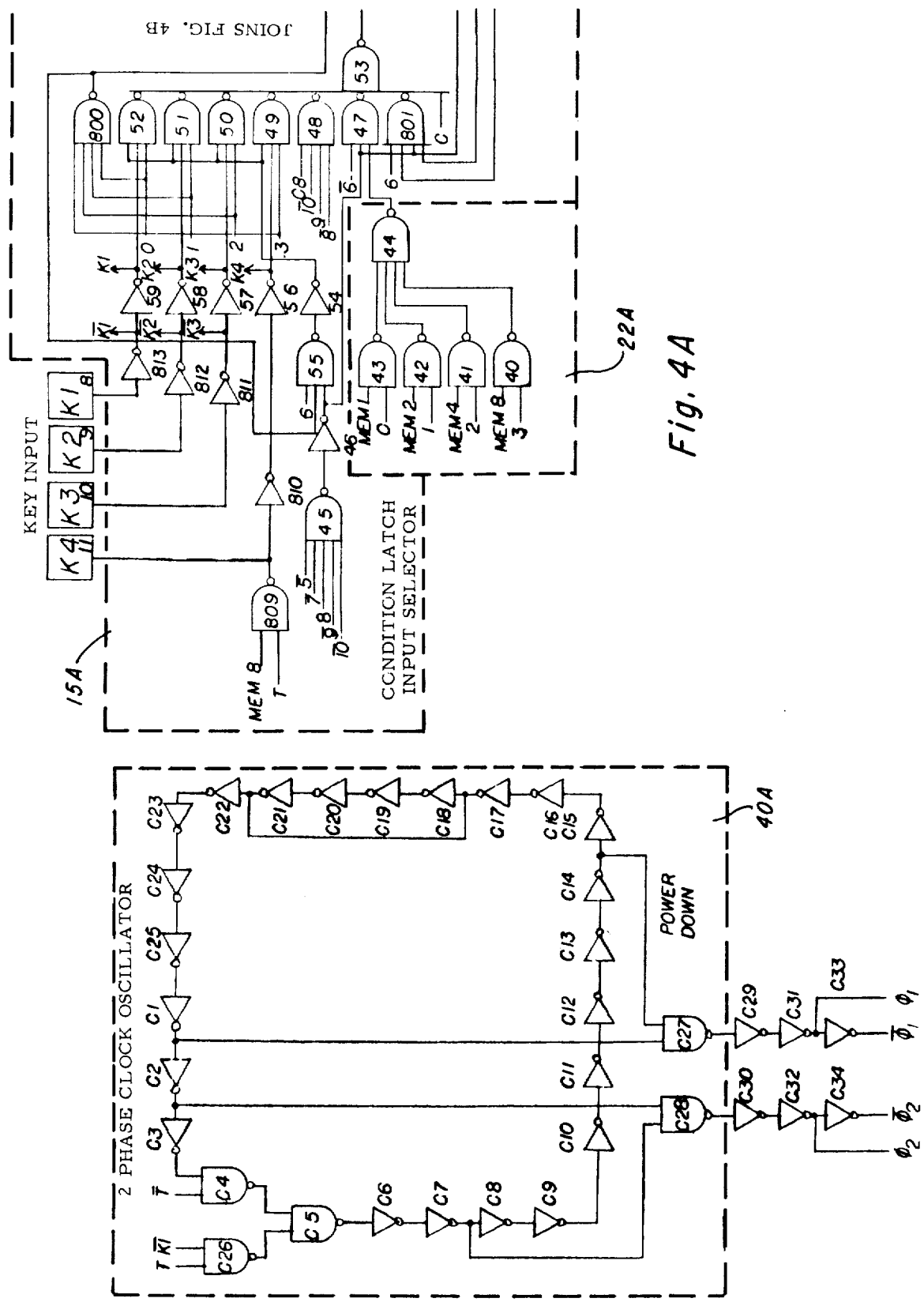
Figure 4C:
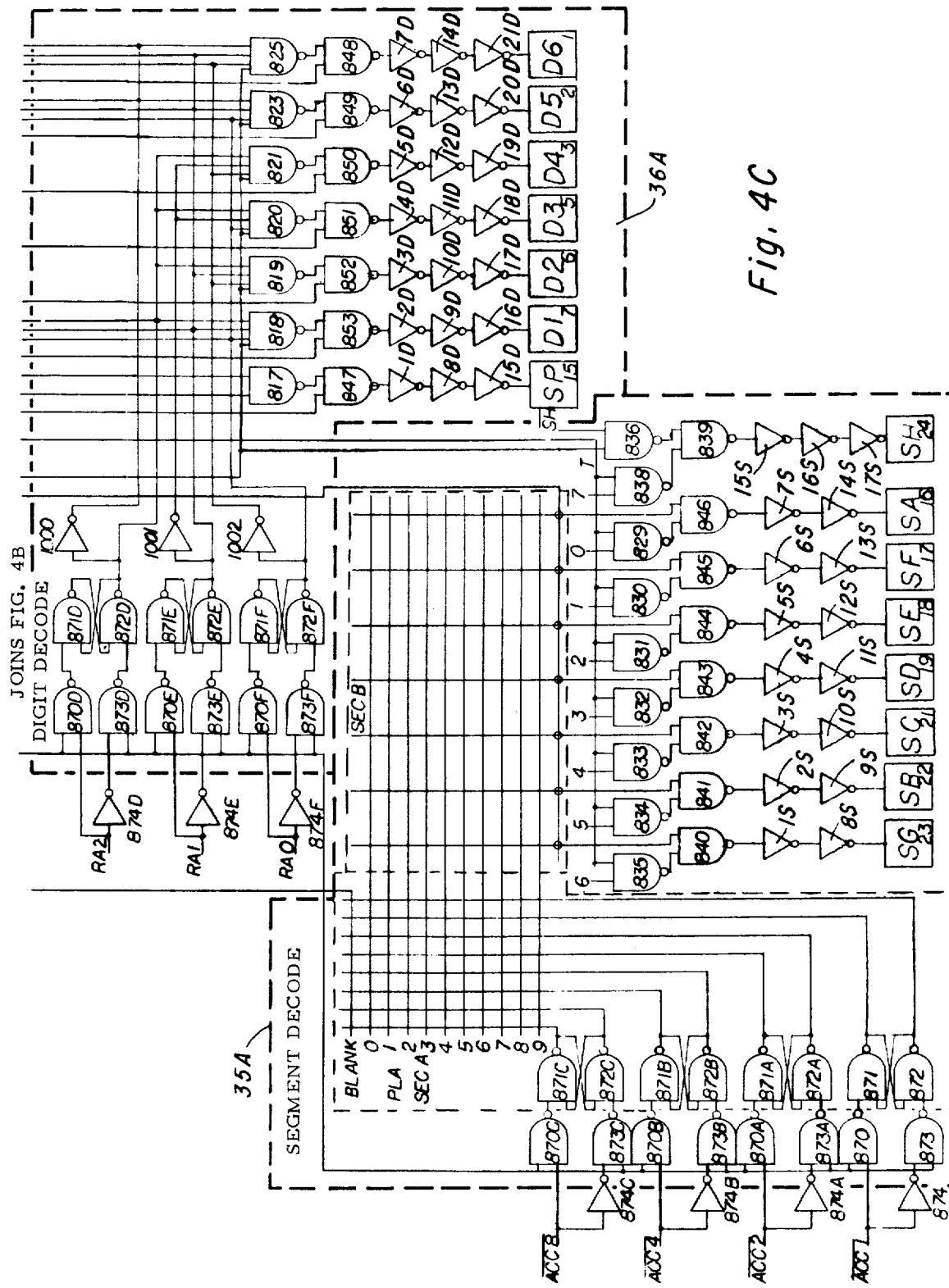
Figure 4D:
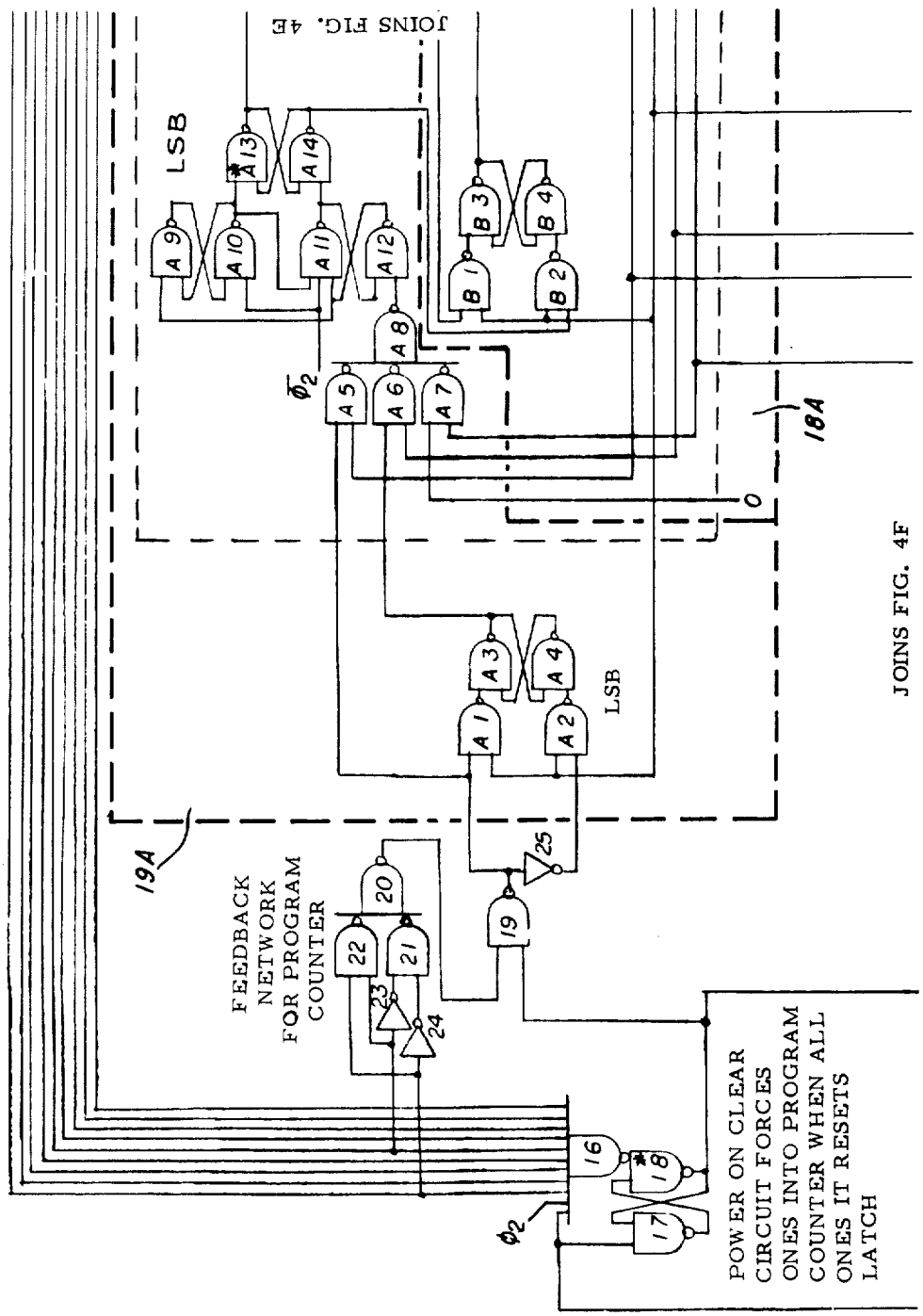
Figure 4E:
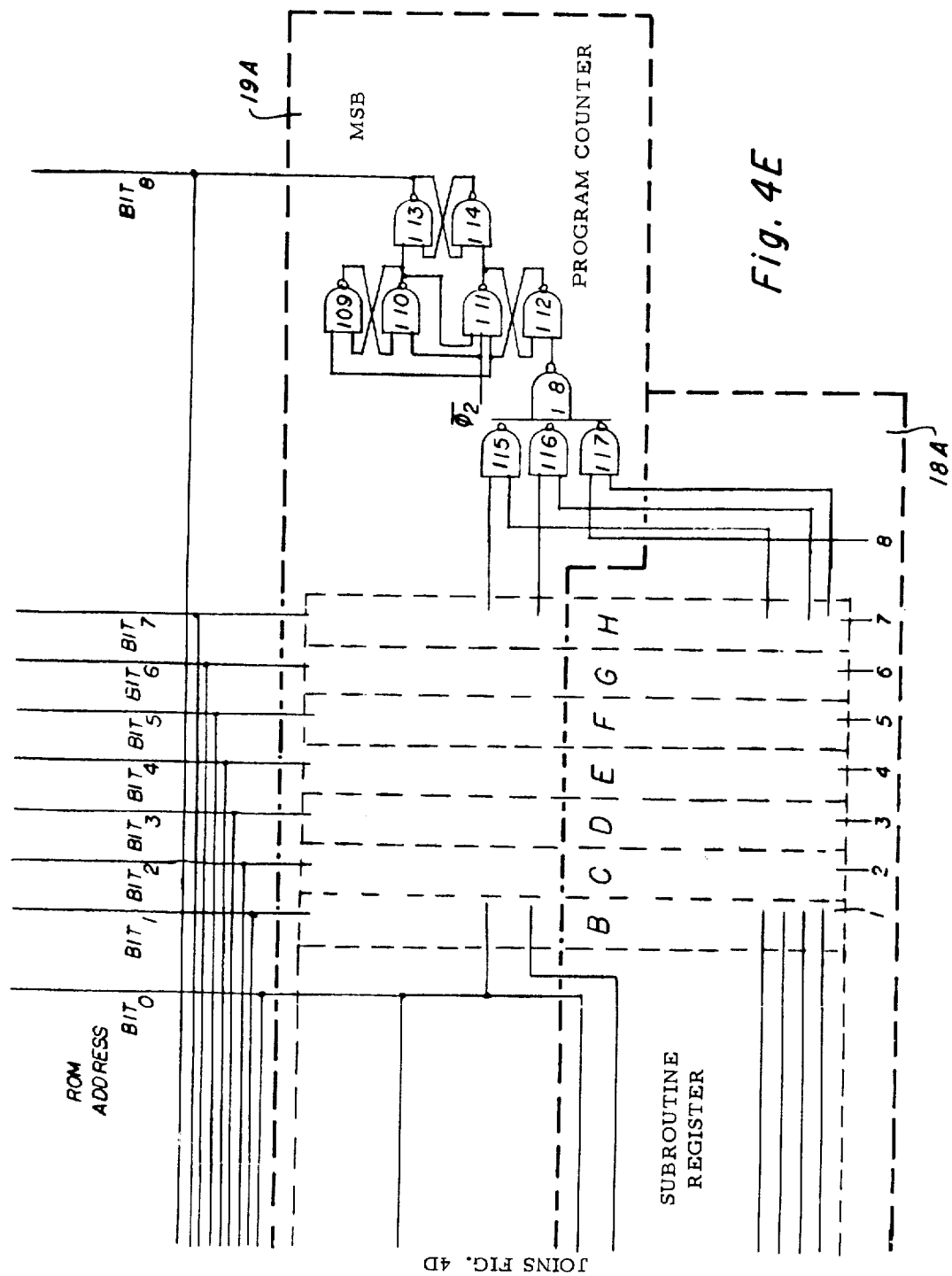
Figure 4G:
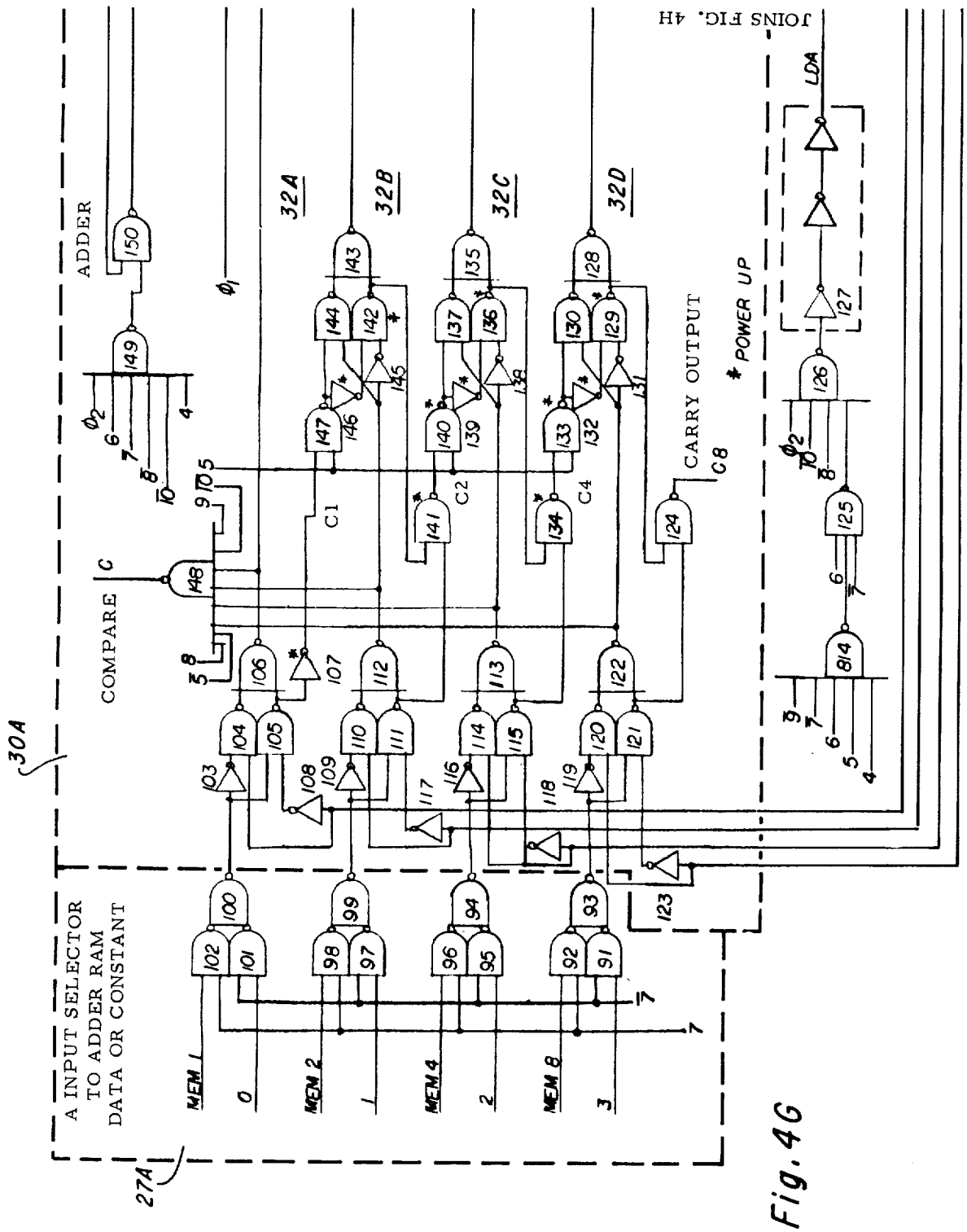
Figure 4I:
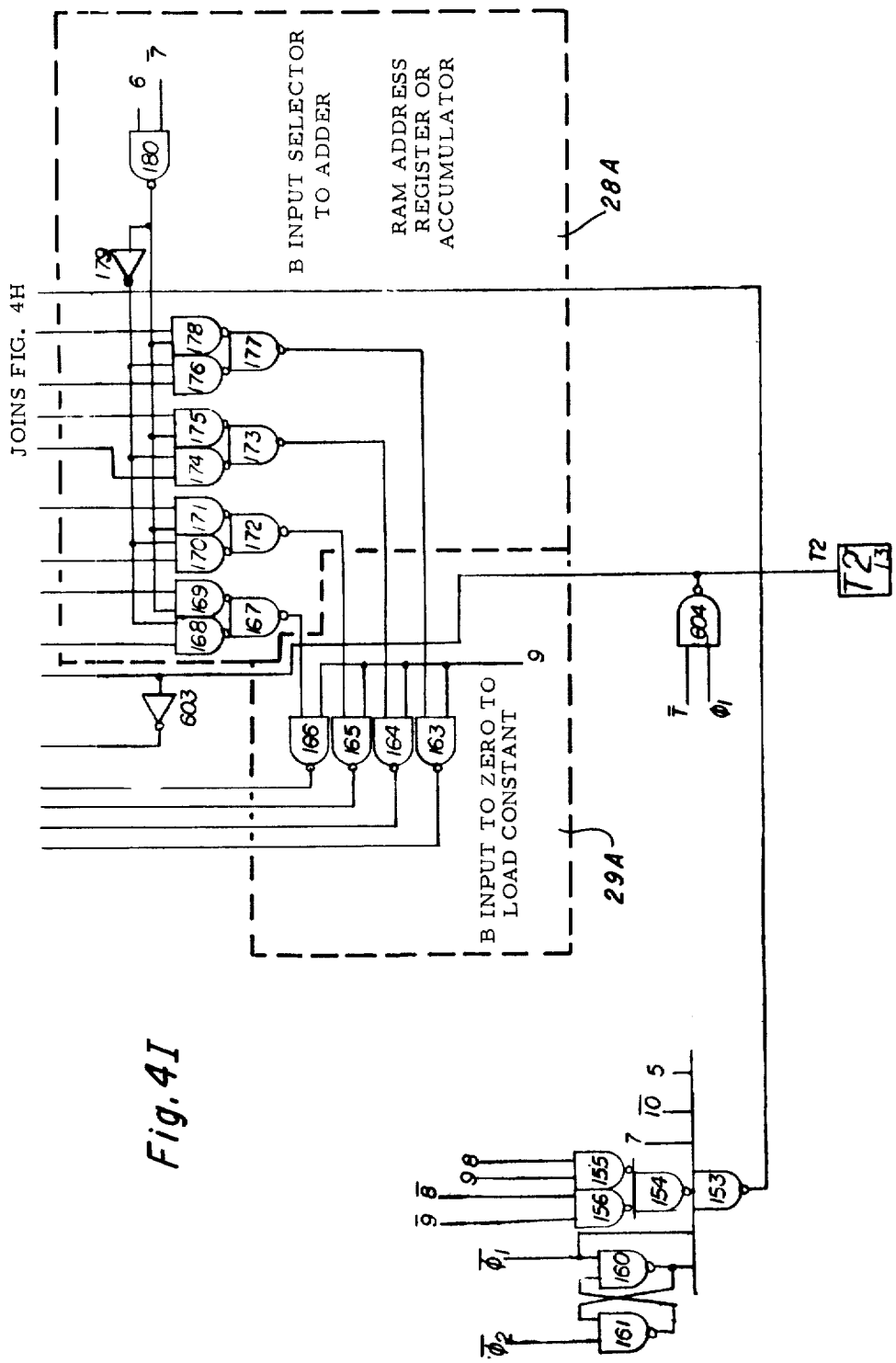

Another unique feature of the calculator system is the particular structure of the adder 30A. The adder 30A is comprised of four 1-bit adders 32A-D. Each 1-bit adder includes first and second half adder stages as shown in FIG. 4G. The first half adder stage of first 1-bit adder section 32A is comprised of NOT gate 103 which receives the first A input bit from A input selector 27A, NOT gate 108 which receives the first B input bit from B input selector 28A, NAND gates 104–106 which add the first A input bit to the first B input bit, and NOT gate 107 which transfers the carry to the second half adder stage of second 1-bit adder 32B. In this particular embodiment, first adder section 32A does not include a second half adder stage and the output from NAND gate 106 is applied directly to an output latch comprised of NOT gate 602 and NAND gates 194–197 which store the adder output during a phase 1 clock pulse. A carry input is omitted because it eliminates about six gates thereby contributing to the reduced size of the semiconductor chip. The input carry function is provided by the ROM instruction which adds a one to any constant of the accumulator when it is loaded. The first half adder stage of second 1-bit adder section 32B is comprised of NOT gate 109 which receives the second A input bit from A input selector 27A, NOT gate 117 which receives the second B input bit from B input selector 28A, NAND gate 110–112 which add the second A input bit to the second B input bit, and NAND gate 141 which transfers the $C_2$ carry to the second half adder stage of third 1-bit adder section 32C. The second half adder stage of second 1-bit adder section 32B includes NAND gates 142–143 and NOT gates 145 and 146 which add the $C_1$ carry applied from NOT gate 107 of first adder section 32A when NAND gate 147 is enabled in accordance with the logical state of instruction bit 5 ($I_5$) from ROM 20A. The first half adder stage of third 1-bit adder section 32C is comprised of NOT gate 116 which receives the third A input bit from A input selector 27A, NOT gate 118 which receives the second B input bit from B input selector 28A, NAND gates 113–115 which add the third A input bit and the third B input bit and NAND gate 134 which transfer the $C_4$ carry bit to the second half adder stage of fourth 1-bit adder section 32D. The second half adder stage of third adder section 32C is comprised of gates 135–139 which add the $C_2$ carry applied from NAND gate 141 of second adder section 32B when NAND gate 140 is enabled in accordance with the logical state of instruction bit 5 as discussed with respect to NAND gate 147. The first half adder stage of fourth 1-bit adder section 32D includes NOT gate 119 for receiving the fourth A input bit from A input selector 27A, NOT gate 123 for receiving the fourth B input bit from B input selector 28A, NAND gates 120–122 for adding the fourth A and B input bits, and NAND gate 124 for generating the $C_8$ carry output. The second half adder section of fourth adder section 32D is comprised of gates 128–133 which add the $C_4$ carry from adder section 32C. NAND gate 133 is enabled in accordance with the logical state of instruction bit 5 from ROM 20A and operates in the same manner as gates 140 and 147. The output latch of adder sections 32B–D are identical to the output latch of section 32A. Thus, adder 30A comprised of sections 32A–D including carry $C_1$ from section 32A to 32B carry $C_2$ from section 32B to 32C and carry $C_4$ from section 32C to 32D when a logical "1" enable signal is applied to NAND gates 133, 140 and 147 by instruction bit 5 from ROM 20A. If instruction bit 5 is a logical "0" NAND gates 133, 140 and 147 disable the carries from adder section to adder section so that the adder sections 32A–32D operate as individual non-carry 1-bit adders. In this manner, adder 30A selectively functions dually as a multi-bit word adder and also as a plurality of single bit adders. The dual function adder is utilized, for example, to perform bit operations for use in flagging and 2's complement addition for subtraction operation as well as normal multi-bit word addition. With the carry disabled, a "1" can be added to any bit without having it carry bit to bit so that selected bits are toggled individually by adding "1" to those bits. Flags are toggled in this manner. For example, utilizing indirect addressing, a particular RAM address is selected by RAM address register 33A. The RAM data applied to the A input selector 27A is added to selected binary 1's from first four bits of the ROm instruction word applied through B input selector 28A with the carry disabled by instruction bit 5 to selectively and individually toggle one or more flags. The altered RAM flag data is then returned to the RAM at the same address without the contents of the accumulator being altered.

Disabling of the carry is also utilized in this embodiment to perform subtraction utilizing 2's complement as indicated above. In order to generate the 2's complement of the data in the accumulator, a numerical 15 from a ROM instruction at the A input selector 27A is added to the contents of the accumulator transferred through B input selector 28A with carry enable gates 133, 140 and 147 disabled by bit 5 of the instruction. In this manner every bit of the accumulator is toggled and a one is added to the results to obtain the 2's complement. Feedback of the complement of the accumulator and the carry is not required thereby reducing the number of inter-connects and selector gates on the front end of the adder and contributing to the smaller sized chip. Adder 30 also includes NAND gate 148 for performing a compare of the outputs from the first adder stages to generate a C compare output to condition latch 15A.

As previously mentioned, there are A and B inputs to the adder with the A input provided by A input selector 27A and the B input provided by B input selector 28A. A input selector 27A selects as the A input to adder 30A either the 4-bit data from the RAM (MEM 1, MEM 2, MEM 4, MEM 8) or the first four bits of the ROM instruction ($I_0$–$I_3$) depending upon the state of instruction bit 7. The A input selector is comprised of NAND gates 100–102 for selection of the first bit, NAND gates 97–99 for selection of the second bit, NAND gates 94–96 for selection of the third bit, and 91–93 for selection of the fourth bit to adder 30. B input selector 28A selects as the B input to adder 30A either the 4-bit output of RAM address register 33A ($RA_0$–$RA_3$) or the four bits of accumulator 24A ($ACC_1$, $ACC_2$, $ACC_4$, $ACC_8$) depending upon the logical states of ROM bits 6 and 7 to NAND gate 180 to NOT gate 179. The input selector 28A includes NAND gates 167–169 for selection of the first bit, NAND gates 170–172 for selction of the second bit, NAND gates 173–175 for selection of the third bit and 176–178 for selection of the fourth bit to adder 30.

Zero selector 29A comprised of NAND gates 163–166 couples B input selector 28A to the B inputs of adder 30A. The zero selector provides for the generation of all zeroes at the B adder inputs in order to load a constant from the ROM by means of A input selector 27A to the A adder inputs. The zeros are generated when the instruction bit 9 to gates 163–166 is a logical "1".

The 4-bit output Y from adder 30A, which does not include the carry output $C_8$, is stored in either RAM address register 33A or accumulator register 34A. In general, RAM address register 33A is utilized to store RAM addresses as previously discussed with respect to indirect addresssing. Four identical sections are provided, one corresponding to each of the adder sections, to store the 4 bits. Each of the sections is comprised of a latch such as that provided by cross-connected NAND gates 199 and 200 shown for the first section and input gates such as NAND gates 198 and 201 also shown only for the first section. The input gates 198–201, etc. are controlled by the load address register enable signal (LDR) generated by instruction decoder NAND gates 149–151. Decoder NAND gates 149–151 decode selected bits from the instruction word and generate the LDR enable signal so that the adder output is loaded into RAM address register 33A for instructions which cause the calculator system to operate on RAM addresses. The outputs $RA_0$–$RA_3$ of RAM address register 33A are coupled to RAM address selector 26A for providing the RAM address to RAM 25A when indirect addressing is selected by instruction bit 6 to RAM address selector 26A. The outputs $RA_0$–$RA_3$ are also fed back to B input selector 28A to adder 30A so that the RAM address may be selectively incremented by the adder. The output bits from the four adder sections 32A–32D are also coupled to accumulator register 34A as indicated above for storing all other data received from the adder. Each section of accumulator register 34A is identical and comprised of two cross-coupled NAND gates such as 203 and 204 shown only for the first section and two input gates such as 202 and 205 also shown only for the first section. The input gates 202 and 205 transfer the data from the adder outputs to the latch as controlled by the load accumulator enable signal (LDA) transferred from decoder NAND gates 814, 125 and 126 up to the gates 202, 205, etc. by means of NOT gates 127. The decoder gates 814, 125 and 126 are coupled to and decode selected bits of the ROM instruction so that the input gates of the accumulator are enabled for all instructions requiring the adder output to be stored in the accumulator register 34A. The output bits $ACC_1$, $ACC_2$, $ACC_4$ and $ACC_8$ from accumulator register 34A are coupled to the corresponding bits of the RAM data input (BIT1, BIT2, BIT4 and BIT8, respectively) for the storage of data in RAM 25A. The accumulator outputs $ACC_1$, $ACC_2$, $ACC_4$ and $ACC_8$ are also fed back to adder 30A by means of B input selector 28A so that additional operations are carried out on data stored in accumulator register 34A by adder 30A.

The $ACC_1$, $ACC_2$, $ACC_4$ and $ACC_8$ accumulator register outputs are also coupled to segment decoder 35A. Segment decoder 35A is illustrated in detail in FIG. 4C as a programmed logic array which accepts the 4-bit binary or binary coded decimal output of accumulator register 34A, stores it in latches and converts it to one of, for example, 7 segments SA–SG. The SH or DP output is provided for the decimal point. The segment decoder of the illustrated embodiment is unique in that the segment outputs are latched at the input to the programmed logic array. Latching of the segments allows the display to be continuous during the time in which the calculator is performing other operations. Latching of the decoder at its input rather than at its output reduces the number of gates and latches required to perform the function thereby contributing to the smaller size of the higher yield semiconductor chip. NAND gates 870, 873 and NOT gate 874 input the first bit from the accumulator which is stored in the first latch comprised of cross-coupled NAND gates 871 and 872. Gates 870A–874A provide the same function for the second bit, gates 870B–874B for the third bit, and gates 870C–874C for the fourth bit. The output section is comprised of NAND gates 829–846 with inverter drivers $S_1$–$S_{17}$ for the segment outputs SA–SH.

Digit scanning is provided in the present embodiment by the output state of the three output bits $RA_0$–$RA_2$ of RAM address register 33A which is decoded by digit decoder 36A. Digit decoder 36A stores the three bits and decodes them into one of six, seven or eight unique digit output signals $D_0$–$D_6$. The first bit from the RAM address register is input to NAND gate 870F and NOT gate 874F to NAND gate 874F and stored in the latch comprised of cross-coupled NAND gates 871F and 872F. Gates 870E–874E provide the same function for the second bit and gates 870D–874D for the third bit.

The latches allow a digit output to be on while the calculator is performing other operations and are provided for the same reason as the input latches to the segment decoder 35A. NAND gates 817–825 and 847–848 provide the unique digit line outputs from the digit decoder 36A to the inverter drivers 1D–21D for digit outputs $D_0$–$D_6$.

In the preferred I²L single chip integrated circuit embodiment of the described calculator system, the inverter drivers 1S–17S and 1D–21D are of the grounded emitter type. The segment drivers 8S–14S and 17S are shunt type drivers as illustrated in FIG. 5. Each of the light emitting diode segments of each digit such as $L_1$ is coupled to the digit line associated with that particular digit $D_0$, $D_1$, $D_2$, etc. and to the common segment line for that particular segment SA, SB, SC, etc. The digit drivers 15D, 16D, 17D, etc. each include an emitter grounded transistor $Q_2$. The segment drivers 8S, 9S, 10S, etc. each include an emitter grounded transistor $Q_1$, a shunt resistor $R_2$ and a load resistor $R_1$ with load resistor $R_1$ coupled to power supply 13A (VCC). To turn off the segment, transistor $Q_1$ pulls the voltage down at node $N_1$ to the point where the light emitting diode $L_1$ is not forward biased. It required more current to keep the light emitting diode $L_1$ turned off than it does to drive the diode $L_1$. In accordance with the described embodiment, in order to reduce the current drawn by those drivers for which the segment is turned off, whenever all segments of a particular digit are blank, the digit driver is turned off (even if it would otherwise be time for that particular digit to be on) and all of the segment drivers are turned off. In that manner, no current flows through resistors $R_1$ and $R_2$ because the digit is off and the segment driver is off thereby conserving a considerable amount of power for blank digits.

With the above scheme, for blank digits, all segments are allowed to be on but the digit line turned off, instead of the normal mode in which the digit line is turned on and the segments are turned off. Without the digit outputs $D_0$–$D_6$ being turned on for the blanked digits, the keyboard 11A is checked only by means of the special automatic blanking circuit of 38A. The automatic blanking circuit switches back to the normal mode for half of an instruction cycle out of 12, for example, instruction cycles per D (digit) time for the key input to be tested.

The autoblanking, minus sign and decimal point latch circuitry 38A is shown on FIG. 4B and provides several unique functions for the calculator. The segment decoder, in addition to decoding the segments, decodes a 15 (1111) to determine whether the digit is blank and generates a BLANK signal to NAND gate 910 of automatic blanking circuit 38A. A disable latch comprised of NAND gates 887 and 888 is controlled by the BLANK signal to NAND gate 910 and also by inputs from NAND gates 889, 890 and 1202. A disable signal is applied to NAND gate 815 and NOT gate 816 by the disable latch to block all segment outputs SA–SG at the output side of the segment decoder PLA and block all digit outputs $D_1$–$D_6$ at the output side of the digit decoder PLA thereby providing blank digits to the display 12A in the minimum power mode.

Gates 890 and 891 decode selected instruction bits and gate 889 detects a phase 1 clock pulse ($\phi_1$) so that on the first phase 1 clock pulse of a load output instruction the digit line is activated as in the normal mode and all segment outputs are forced to their load state so that the display is blank for a blank digit due to the segments being blank. During this same half clock pulse, the key latch comprised of NOT gate 802 and NAND gates 803–805 is enabled to be set if a key is actuated. Then, at the phase 2 clock pulse which is detected by one input of NAND gate 910, if the digit is not $D_6$ (indicating a possible minus sign) and the digit is a blank as indicated by the BLANK signal, the output of gate 910 causes latch 887, 888 to shut off all of the digit and segment outputs so that the drivers are drawing no current for the next 11 instruction cycles to take place during the particular D time.

Circuitry 38A also includes a minus sign latch comprised of NAND gates 893–901 which is set by negative numbers and a decimal point latch comprised of NAND gates 902–905.

NAND gates 806–808, 822, 24, 26, and 28 provide means for directly outputting the contents of RAM 25A, condition latch 17 and ROM instruction bits 8–10 via digit decoder gates 848–853 for test purposes. This is accomplished by providing a test enable signal (T) to terminal $\overline{T}_{14}$. In a like manner, the test enable signal enables gates 840–846 of segment decoder 35A to output ROM instruction bits 0–7 for test purposes.

The I²L calculator system as described above is controlled by a two phase clock system provided by oscillator 40A. The oscillator is comprised of inverter gates C1–C25, NAND output gates C27 and C28, and output inverter gates C29–C34. The inverter gates C1–C25 are an odd number so that the logic level of gate C27, for example, goes to one at the input from gate C1 when the pulse is at gate C1. When the pulse reaches gate C14, gate C27 is switched to zero. The pulse continues to travel around the loop to gate C1 again and gate C27 is switched back to a logical "1" thereby providing clock pulses of phase 1 ($\phi_1$). Gate C28 which operates in a similar manner is out of phase with the first phase clock pulses, receiving its input from gates C2 and C7 to produce the clock pulses of the second phase ($\phi_2$).

As mentioned previously, the calculator system operates in accordance with a program stored in ROM 20A. The instruction set for the illustrated embodiment of the calculator system is given in Table I. An example of a specific program for the four function calculator illustrated in FIG. 1 is given in its entirety in Table II.

TABLE I

INSTRUCTION SET

| Mnemonic | ROM CODE | | | | | | | | | | | Action and Description |
|---|---|---|---|---|---|---|---|---|---|---|---|---|
| | $I_{10}$ | $I_9$ | $I_8$ | $I_7$ | $I_6$ | $I_5$ | $I_4$ | $I_3$ | $I_2$ | $I_1$ | $I_0$ | |
| AKRA | 0 | 1 | 0 | 0 | 1 | 1 | 1 | $K_8$ | $K_4$ | $K_2$ | $K_1$ | K+RAMAD → RAMAD — A four bit constant $K_8$–$K_1$ is added to the contents RA3–RA0 of RAM address register 33A and the results stored in register 33A. If a carry output (C8) is produced condition latch 15A is set to 0 for one instruction cycle. |
| AKAC | 0 | 1 | 0 | 0 | 0 | CE | 0 | $K_8$ | $K_4$ | $K_2$ | $K_1$ | K+ACC → ACC — A four bit constant $K_8$–$K_1$ is added to the contents $ACC_8$–$ACC_1$ of accumulator register 34A and the results stored in register 34A. CE is adder carry enable; 1 = enable. If a carry (C8) is produced condition latch 15A is set to 0 for one instruction cycle. |
| CKRA | 0 | 1 | 1 | 0 | 1 | 0 | 0 | $K_8$ | $K_4$ | $K_2$ | $K_1$ | K$\stackrel{?}{=}$RAMAD — A four bit constant $K_8$–$K_1$ is compared to the contents of RAM address register 33A. If they compare (C) condition latch 15A is set to 0 for one instruction cycle. |
| CKAC | 0 | 1 | 1 | 0 | 0 | 0 | 0 | $K_8$ | $K_4$ | $K_2$ | $K_1$ | K$\stackrel{?}{=}$ACC — A four bit constant $K_8$–$K_1$ is compared to the contents of accumulator register 34A. If they compare (C) condition latch 15A is set to 0 for one instruction cycle. |
| LKRA | 0 | 0 | 0 | 0 | 1 | 0 | 1 | $K_8$ | $K_4$ | $K_2$ | $K_1$ | K → RAMAD — A four bit constant $K_8$–$K_1$ is stored in RAM address register 33A. |
| LKAC | 0 | 0 | 0 | 0 | 0 | 0 | 0 | $K_8$ | $K_4$ | $K_2$ | $K_1$ | K → ACC — A four bit constant $K_8$–$K_1$ is stored in accumulator register 34A. |
| LKAR | 0 | 0 | 0 | 0 | 1 | 1 | 1 | $K_8$ | $K_4$ | $K_2$ | $K_1$ | K → RAMAD; K → ACC — A four bit constant $K_8$–$K_1$ is stored in both RAM address register 33A and accumulator register 34A. |
| AMAC | 0 | 1 | 0 | 1 | ADS | 1 | | $R_{16}$ | $R_8$ | $R_4$ | $R_2$ | $R_1$ | MEM+ACC → ACC The contents of RAM 25A at a specified address is added to the contents of accumulator register 34A and the results are stored in register 34A. If a |

TABLE I-continued

INSTRUCTION SET

| Mnemonic | $I_{10}$ | $I_9$ | $I_8$ | $I_7$ | $I_6$ | $I_5$ | $I_4$ | $I_3$ | $I_2$ | $I_1$ | $I_0$ | Action and Description |
|---|---|---|---|---|---|---|---|---|---|---|---|---|
| | | | | | | | | | | | | carry (C8) is produced condition latch 15A is set to 0 for one instruction cycle. *The specified address is $R_{16}$-$R_1$ is ADS is 1 (direct address) or $R_{16}$, RA3-RA0 if ADS is 0 (indirect address). |
| CMAC | 0 | 1 | 1 | 1 | ADS | 0 | $R_{16}$ | $R_8$ | $R_4$ | $R_2$ | $R_1$ | MEM=ACC — The contents of RAM 25A at a specified address* is compared to the contents of accumulator register 34A. If they compare (C) condition latch 15A is set to 0 for one instruction cycle. |
| MTOA | 0 | 0 | 0 | 1 | ADS | 0 | $R_{16}$ | $R_8$ | $R_4$ | $R_2$ | $R_1$ | MEM → ACC — The contents of RAM 25A at a specified address* is stored in accumulator register 34A. |
| ATOM | 0 | 1 | 1 | 1 | ADS | 1 | $R_{16}$ | $R_8$ | $R_4$ | $R_2$ | $R_1$ | ACC → MEM — The contents of accumulator register 34A is stored in RAM 25A at a specified address*. |
| EXAM | 0 | 0 | 0 | 1 | ADS | 1 | $R_{16}$ | $R_8$ | $R_4$ | $R_2$ | $R_1$ | MEM ⇆ ACc — The contents of accumulator register 34A and the contents at a specified address* of RAM 25A are exchanged. |
| MTRA | 0 | 0 | 1 | 1 | ADS | 0 | $R_{16}$ | $R_8$ | $R_4$ | $R_2$ | $R_1$ | MEM → RAMAD — The contents of RAM 25A at a specified address* is stored in RAM address register 33A. |
| BRNC | 1 | 0 | $A_8$ | $A_7$ | $A_6$ | $A_5$ | $A_4$ | $A_3$ | $A_2$ | $A_1$ | $A_0$ | BRANCH if condition latch is equal to 1. $A_8$-$A_0$ is the branch address. |
| CALL | 1 | 1 | $A_8$ | $A_7$ | $A_6$ | $A_5$ | $A_4$ | $A_3$ | $A_2$ | $A_1$ | $A_0$ | CALL if condition latch is equal to 1. $A_8$-$A_0$ is the call address. |
| RETN | 0 | 0 | 1 | 0 | 1 | 1 | 0 | 0 | 0 | 0 | 0 | RETURN if in CALL mode, otherwise NO-OP. |
| TSTF | 0 | 0 | 1 | 0 | 0 | 0 | $R_{16}$ | $F_4$ | $F_3$ | $F_2$ | $F_1$ | Test Flag — $F_4$-$F_1$ are flag test select bits. A flat test is performed on each bit of a RAM word at a specified location for which the select bit is a 1. Any bit or the logical OR of any combination of bits selected by the flag test select bits of the addressed RAM word are tested. The specified location is, in this instance, always the indirect address $R_{16}$, RA3-RA0. |
| TSTK | 0 | 0 | 1 | 0 | 1 | 0 | 0 | $K_4$ | $K_3$ | $K_2$ | $K_1$ | Test Key Line — $K_4$-$K_1$ are the key line select bits. Any key line can be tested. If the test is true, condition latch 15A remains 1. For a special TSTK instruction (TSTKF) in which $I_3$-$I_0$ = 1111, the key latch is checked. If the key latch is set to 1, it indicates a key being detected since the last TSTKF instruction and condition latch 15A is set to 0 for one instruction cycle. |
| LOUT | 0 | 0 | 1 | 0 | 1 | 1 | 1 | 1 | 0 | 0 | 0 | Load Outputs |
| SMIN | 0 | 0 | 1 | 0 | 1 | 1 | 0 | 1 | 0 | 0 | 0 | Set Minus Sign Latch |

TABLE II

Example of ROM Program

| ROM Address | Instruction | Statement | Source Statement | | | |
|---|---|---|---|---|---|---|
| 000 | 0000111 1111 | 0072 | TOFFDIS | LKAR | 15 | |
| 001 | 001011 11000 | 0073 | | LOUT | | TURN OFF DISPLAY |
| 002 | 0000101 1010 | 0074 | | LKRA | 10 | |
| 003 | 001011 00000 | 0075 | | RETN | | |
| 004 | 0000111 0000 | 0076 | PUP | LKAR | 0 | |
| 005 | 0111101 0 0000 | 0077 | PUP1 | ATOM0 | | |
| 006 | 0100111 0001 | 0078 | | AKRA | 1 | |
| 007 | 10 000000101 | 0079 | | BRNC | PUP1 | |
| 008 | 001011 00000 | 0080 | | RETN | | |
| 009 | 0111101 1 0000 | 0081 | PUP2 | ATOM1 | | |
| 00A | 0100111 0001 | 0082 | | AKRA | 1 | |
| 00B | 10 000001001 | 0083 | | BRNC | PUP2 | |
| 00C | 0000101 1000 | 0084 | LOCK1 | LKRA | 8 | |
| 00D | 001000 1 0001 | 0085 | | TSTF1 | F1 | |
| 00E | 11 000011011 | 0086 | | CALL | TOGF1 | |
| 00F | 0000000 1000 | 0087 | LOCK | LKAC | 8 | |
| 010 | 0111111 0 0111 | 0088 | | ATOMCO | 7 | |
| 011 | 0000111 1110 | 0089 | NOLOCK | LKAR | 14 | |
| 012 | 0000000 0110 | 0090 | | LKAC | 6 | |
| 013 | 0111111 0 0110 | 0091 | PDIS1 | ATOMCO | 6 | |
| 014 | 0000000 1111 | 0092 | | LKAC | 15 | |
| 015 | 0111101 0 0000 | 0093 | | ATOM0 | | |
| 016 | 0100111 1111 | 0094 | | AKRA | 15 | |
| 017 | 0101111 0 0110 | 0095 | | AMACCO | 6 | |
| 018 | 001000 0 1111 | 0096 | | MNE00 | | |
| 019 | 10 000011111 | 0097 | | BRNC | PDIS2 | |
| 01A | 10 000100001 | 0098 | | BRNC | LOVF1 | ALWAYS BRANCH |
| 01B | 000101 1 0000 | 0099 | TOGF1 | EXAM1 | | |
| 01C | 0100000 0001 | 0100 | | AKNC | 1 | |
| 01D | 000101 1 0000 | 0101 | | EXAM1 | | |
| 01E | 001011 00000 | 0102 | | RETN | | |
| 01F | 0111110 0 1111 | 0103 | PDIS2 | CMACD0 | 15 | |
| 020 | 10 000010011 | 0104 | | BRNC | PDIS1 | |
| 021 | 0000000 0001 | 0105 | LOVF1 | LKAC | 1 | |
| 022 | 0000101 1000 | 0106 | | LKRA | 8 | |
| 023 | 10 000110000 | 0107 | | BRNC | DIS4 | ALWAYS BRANCH |
| 024 | 0000101 1000 | 0108 | DIS1 | LKRA | 8 | |
| 025 | 0000000 0000 | 0109 | | LKAC | 0 | |
| 026 | 0111110 0 1111 | 0110 | | CMACC0 | 15 | |
| 027 | 000100 0 0000 | 0111 | | MTOA0 | | |
| 028 | 001011 11000 | 0112 | | LOUT | | |
| 029 | 001010 01111 | 0113 | | TSTKF | | |
| 02A | 10 000111100 | 0114 | | BRNC | DIS2 | |
| 02B | 000110 0 0111 | 0115 | | MTOACO | 7 | |
| 02C | 001011 00000 | 0116 | | RETN | | THIS IS ONLY A NO OP |
| 02D | 0100010 1000 | 0117 | | AKAC | 8 | |
| 02E | 10 001010010 | 0118 | | BRNC | DIS3 | |
| 02F | 0100010 0001 | 0119 | DISOVF | AKAC | 1 | |
| 030 | 0111111 0 0110 | 0120 | DIS4 | ATOMCO | 6 | |
| 031 | 0100111 0001 | 0121 | | AKRA | 1 | |
| 032 | 0111110 0 1111 | 0122 | | CMACC0 | 15 | |
| 033 | 000100 0 0000 | 0123 | | MTOA0 | | |
| 034 | 001011 11000 | 0124 | | LOUT | | |
| 035 | 000110 1 1000 | 0125 | | MTOAD1 | 8 | |
| 036 | 0100010 1000 | 0126 | | AKAC | 8 | |
| 037 | 000110 0 0110 | 0127 | | MTOACO | 6 | |
| 038 | 001011 01000 | 0128 | | SMIN | | |
| 039 | 0110100 1101 | 0129 | | CKRA | 13 | |
| 03A | 10 000101111 | 0130 | | BRNC | DISOVF | |
| 03B | 10 000100100 | 0131 | | BRNC | DIS1 | ALWAYS BRANCH |
| 03C | 0000000 0000 | 0132 | DIS2 | LKAC | 0 | |
| 03D | 0111111 0 0111 | 0133 | | ATOMCO | 7 | |
| 03E | 001000 1 0100 | 0134 | | TSTF1 | F3 | |

TABLE II—Continued

| | | | | | |
|---|---|---|---|---|---|
| 03F | 10 000101111 | 0135 | | BRNC | DISOVF |
| 040 | 11 010010011 | 0136 | | CALL | THREE |
| 041 | 11 000000000 | 0137 | | CALL | TOFFDIS |
| 042 | 0000111 0000 | 0138 | ADDC | LKAR | 0 |
| 043 | 0111111 0111 | 0139 | | ATOMC1 | 7 |
| 044 | 000100 1 0000 | 0140 | ADDC1 | MTOA1 | |
| 045 | 0100010 1000 | 0141 | | AKAC | 8 |
| 046 | 10 001001010 | 0142 | | BRNC | ADDC2 |
| 047 | 0111011 0000 | 0143 | | ATOM1 | |
| 048 | 0100111 0001 | 0144 | | AKRA | 1 |
| 049 | 10 001000100 | 0145 | | BRNC | ADDC1 | ALWAYS BRANCH |
| 04A | 0111011 0000 | 0146 | ADDC2 | ATOM1 | |
| 04B | 001011 00000 | 0147 | | RETN | |
| 04C | 0110100 0111 | 0148 | | CKRA | 7 |
| 04D | 10 000100001 | 0149 | | BRNC | LOVF1 |
| 04E | 11 001000010 | 0150 | LOVF2 | CALL | ADDC |
| 04F | 0110100 0111 | 0151 | | CKRA | 7 |
| 050 | 10 001001110 | 0152 | | BRNC | LOVF2 |
| 051 | 10 000100001 | 0153 | | BRNC | LOVF1 | ALWAYS BRANCH |
| 052 | 0100010 1001 | 0154 | DIS3 | AKAC | 9 |
| 053 | 0111111 0 0111 | 0155 | | ATOMC0 | 7 |
| 054 | 0110000 0011 | 0156 | | CKAC | 3 | *** THIS IS THE TIME |
| 055 | 10 000110000 | 0157 | | BRNC | DIS4 | CONSTANT FOR |
| 056 | 11 000000000 | 0158 | | CALL | TOFFDIS | DEBOUNCE *** |
| 057 | 11 010010110 | 0159 | | CALL | EXBA |
| 058 | 0000000 0000 | 0160 | | LKAC | 0 |
| 059 | 11 000000101 | 0161 | | CALL | PUP1 |
| 05A | 0001000 0000 | 0162 | CLF1 | MTOAC | |
| 05B | 0110000 1111 | 0163 | | CKAC | 15 |
| 05C | 10 001011111 | 0164 | | BRNC | CLF2 |
| 05D | 0000000 0000 | 0165 | | LKAC | 0 |
| 05E | 0111010 0000 | 0166 | | ATOM0 | |
| 05F | 0100111 0001 | 0167 | CLF2 | AKRA | 1 |
| 060 | 10 001011010 | 0168 | | BRNC | CLF1 |
| 061 | 0000111 1101 | 0169 | | LKAR | 13 |
| 062 | 001011 11000 | 0170 | | LOUT | |
| 063 | 0010100 0001 | 0171 | | TSTK | K1 |
| 064 | 10 000000000 | 0172 | | BRNC | TOFFDIS |
| 065 | 0000101 1000 | 0173 | | LKRA | 8 |
| 066 | 001000 1 0100 | 0174 | | TSTF1 | F3 |
| 067 | 10 001101001 | 0175 | | BRNC | NOTOVF |
| 068 | 10 110110101 | 0176 | | BRNC | LOCKB | ALWAYS BRANCH |
| 069 | 0010100 0100 | 0177 | NOTOVF | TSTK | K3 |
| 06A | 10 011001100 | 0178 | | BRNC | DIVIDE |
| 06B | 0000101 0011 | 0179 | | LKRA | 3 |
| 06C | 001011 11000 | 0180 | | LOUT | |
| 06D | 0010100 0100 | 0181 | | TSTK | K3 |
| 06E | 10 011001110 | 0182 | | BRNC | PLUS |
| 06F | 0010100 0001 | 0183 | TK124 | TSTK | K1 |
| 070 | 10 010010011 | 0184 | | BRNC | THREE |
| 071 | 0010100 0010 | 0185 | | TSTK | K2 |
| 072 | 10 010010010 | 0186 | | BRNC | TWO |
| 073 | 0010100 1000 | 0187 | | TSTK | K4 |
| 074 | 10 010010001 | 0188 | | BRNC | ONE |
| 075 | 001011 00000 | 0189 | | RETN | |
| 076 | 0000101 0001 | 0190 | | LKRA | 1 |
| 077 | 001011 11000 | 0191 | | LOUT | |
| 078 | 0010100 0100 | 0192 | | TSTK | K3 |
| 079 | 10 011001101 | 0193 | | BRNC | TIMES |
| 07A | 11 001101111 | 0194 | | CALL | TK124 |
| 07B | 0110000 1101 | 0195 | | CKAC | 13 |
| 07C | 10 010010011 | 0196 | | BRNC | THREE |
| 07D | 0000101 0100 | 0197 | | LKRA | 4 |
| 07E | 001011 11000 | 0198 | | LOUT | |
| 07F | 0010100 0100 | 0199 | | TSTK | K3 |
| 080 | 10 011011011 | 0200 | | BRNC | EQUALS |
| 081 | 0010100 0001 | 0201 | | TSTK | K1 |
| 082 | 10 010010101 | 0202 | | BRNC | NUMENT |
| 083 | 0000000 0000 | 0203 | | LKAC | 0 |
| 084 | 0010100 0010 | 0204 | | TSTK | K2 |
| 085 | 10 010010101 | 0205 | | BRNC | NUMENT |
| 086 | 0010100 1000 | 0206 | | TSTK | K4 |
| 087 | 10 010111001 | 0207 | | BRNC | CE |
| 088 | 0000111 1010 | 0208 | | LKAR | 10 |
| 089 | 001011 11000 | 0209 | | LOUT | |

TABLE II—Continued

| | | | | | |
|---|---|---|---|---|---|
| 08A | C010100 C100 | 0210 | | TSTK | K3 |
| 08B | 10 010111111 | 0211 | | BRNC | MINUS |
| 08C | 11 001101111 | 0212 | | CALL | TK124 |
| 08D | C110000 1010 | 0213 | | CKAC | 10 |
| 08E | 10 010010011 | 0214 | | BRNC | THREE |
| 08F | 11 010010110 | 0215 | | CALL | EXBA |
| 090 | 10 000010001 | 0216 | | BRNC | NOLOCK ALWAYS BRANCH |
| 091 | 0100010 1111 | 0217 | ONE | AKAC | 15 |
| 092 | C100010 1111 | 0218 | TWO | AKAC | 15 |
| 093 | C100010 0110 | 0219 | THREE | AKAC | 6 |
| 094 | 001011 00000 | 0220 | | RETN | |
| 095 | C11111 0 1001 | 0221 | NUMENT | ATOMC0 | 9 |
| 096 | 0000101 0000 | 0222 | EXBA | LKRA | 0 |
| 097 | C00100 0 0000 | 0223 | EXBA1 | MTOA0 | |
| 098 | 0100111 1000 | 0224 | | AKRA | 8 |
| 099 | 000101 0 C000 | 0225 | | EXAMO | |
| 09A | 0100111 1000 | 0226 | | AKRA | 8 |
| 09B | C11101 0 0000 | 0227 | | ATOMC | |
| 09C | 0100111 0001 | 0228 | | AKRA | 1 |
| 09D | C110100 1000 | 0229 | | CKRA | 8 |
| 09E | 10 010010111 | 023C | | BRNC | EXBA1 |
| 09F | 001011 00000 | 0231 | | RETN | |
| 0A0 | C01000 1 C001 | 0232 | | TSTF1 | F1 |
| 0A1 | 10 010100100 | 0233 | | BRNC | NU1 |
| 0A2 | 11 000000101 | 0234 | | CALL | PUP1 |
| 0A3 | C11111 1 1000 | 0235 | | ATOMD1 | 8 |
| 0A4 | 0000101 1000 | 0236 | NU1 | LKRA | 8 |
| 0A5 | 000110 0 0001 | 0237 | | MTOAC0 | 1 |
| 0A6 | C110000 1101 | 0238 | | CKAC | 13 |
| 0A7 | 10 010101011 | 0239 | | BRNC | NOTDPT |
| 0A8 | C01000 1 C010 | 024C | | TSTF1 | F2 |
| 0A9 | 11 110110001 | 0241 | | CALL | TOGF2 |
| 0AA | 10 000001111 | 0242 | | BRNC | LOCK ALWAYS BRANCH |
| 0AB | 000110 0 1101 | 0243 | NOTDPT | MTOAC0 | 13 |
| 0AC | C110000 C000 | 0244 | | CKAC | 0 |
| 0AD | 10 000001111 | 0245 | | BRNC | LOCK |
| 0AE | C01000 1 C010 | 0246 | | TSTF1 | F2 |
| 0AF | 10 010110110 | 0247 | | BRNC | NU3 |
| 0B0 | 000110 0 1111 | 0248 | | MTOAC0 | 15 |
| 0B1 | 0110000 0101 | 0249 | | CKAC | 5 |
| 0B2 | 10 010110100 | 025C | | BRNC | NU4 |
| 0B3 | 10 000001111 | 0251 | | BRNC | LOCK ALWAYS BRANCH |
| 0B4 | 0100010 C001 | 0252 | NU4 | AKAC | 1 |
| 0B5 | C11111 0 1111 | 0253 | | ATOMC0 | 15 |
| 0B6 | 000110 0 C001 | 0254 | NU3 | MTOAC0 | 1 |
| 0B7 | 11 101000111 | 0255 | | CALL | SL1 |
| 0B8 | 10 000001111 | 0256 | | BRNC | LOCK |
| 0B9 | 11 010010110 | 0257 | CE | CALL | EXBA |
| 0BA | 000110 1 1000 | 0258 | | MTOAC1 | 8 |
| 0BB | 001000 1 C001 | 0259 | | TSTF1 | F1 |
| 0BC | 11 000000100 | 0260 | | CALL | PUP |
| 0BD | 011111 1 1000 | 0261 | CE1 | ATOMC1 | 8 |
| 0BE | 10 000001100 | 0262 | | BRNC | LOCK1 ALWAYS BRANCH |
| 0BF | C01000 1 0001 | 0263 | MINUS | TSTF1 | F1 |
| 0C0 | 10 011001111 | 0264 | | BRNC | MIN1 |
| 0C1 | 0000101 1000 | 0265 | | LKRA | 8 |
| 0C2 | C01000 1 0001 | 0266 | | TSTF1 | F1 |
| 0C3 | 10 011001111 | 0267 | | BRNC | MIN1 |
| 0C4 | C000101 1001 | 0268 | | LKRA | 9 |
| 0C5 | C01000 1 C010 | 0269 | | TSTF1 | F2 |
| 0C6 | 10 011001000 | 027C | | BRNC | MIN2 |
| 0C7 | 10 011001111 | 0271 | | BRNC | MIN1 |
| 0C8 | 11 000000100 | 0272 | MIN2 | CALL | PUP |
| 0C9 | C000000 1C00 | 0273 | | LKAC | 8 |
| 0CA | 011111 1 1000 | 0274 | | ATOMC1 | 8 |
| 0CB | 10 000001111 | 0275 | | BRNC | LOCK |
| 0CC | 0100010 0100 | 0276 | DIVIDE | AKAC | 4 |
| 0CD | C100010 1111 | 0277 | TIMES | AKAC | 15 |
| 0CE | C100010 0101 | 0278 | PLUS | AKAC | 5 |
| 0CF | 011111 1 1011 | 0279 | MIN1 | ATOMC1 | 11 |
| 0D0 | 11 000000000 | 0280 | | CALL | TOFFDIS |
| 0D1 | C01000 1 1111 | 0281 | | MNE01 | |
| 0D2 | 10 101111000 | 0282 | | BRNC | PPOST |

TABLE II—Continued

| | | | | | |
|---|---|---|---|---|---|
| 0D3 | 0000101 1001 | 0283 | | LKRA | 9 |
| 0D4 | 001000 1 0010 | 0284 | | TSTF1 | F2 |
| 0D5 | 10 011010111 | 0285 | | BRNC | NOTPOST |
| 0D6 | 10 101111000 | 0286 | | BRNC | PPOST ALWAYS BRANCH |
| 0D7 | 0000101 1000 | 0287 | NOTPOST | LKRA | 8 |
| 0D8 | 001000 1 0001 | 0288 | | TSTF1 | F1 |
| 0D9 | 10 011011110 | 0289 | | BRNC | PRENORM |
| 0DA | 10 101111000 | 0290 | | BRNC | PPOST ALWAYS BRANCH |
| 0DB | 11 000000000 | 0291 | EQUALS | CALL | TOFFDIS |
| 0DC | 001000 1 1111 | 0292 | | MNEO1 | |
| 0DD | 10 101111000 | 0293 | | BRNC | PPOST |
| 0DE | 11 010001C110 | 0294 | PRENORM | CALL | EXBA |
| 0DF | 000110 0 1101 | 0295 | PRE1 | MTOACO | 13 |
| 0E0 | 0110000 0000 | 0296 | | CKAC | 0 |
| 0E1 | 10 011101000 | 0297 | | BRNC | PRE2 |
| 0E2 | 11 101000110 | 0298 | | CALL | SL |
| 0E3 | 000110 0 1111 | 0299 | | MTOADO | 15 |
| 0E4 | 0100010 0001 | 0300 | | AKAC | 1 |
| 0E5 | 011111 0 1111 | 0301 | | ATUMCO | 15 |
| 0E6 | 0110000 1010 | 0302 | | CKAC | 10 |
| 0E7 | 10 011011111 | 0303 | | BRNC | PRE1 |
| 0E8 | 11 100010010 | 0304 | PRE2 | CALL | EXBC |
| 0E9 | 11 101010011 | 0305 | | CALL | TOGF3 |
| 0EA | 001000 1 0100 | 0306 | | TSTF1 | F3 |
| 0EB | 10 011101101 | 0307 | | BRNC | EXC1 |
| 0EC | 10 011011111 | 0308 | | BRNC | PRE1 ALWAYS BRANCH |
| 0ED | 0000101 1001 | 0309 | EXC1 | LKRA | 9 |
| 0EE | 001000 1 0010 | 0310 | | TSTF1 | F2 |
| 0EF | 10 011110001 | 0311 | | BRNC | EXSIGN1 |
| 0F0 | 10 011111001 | 0312 | | BRNC | EXC2 ALWAYS BRANCH |
| 0F1 | 0000101 1010 | 0313 | EXSIGN1 | LKRA | 10 |
| 0F2 | 001000 1 1000 | 0314 | | TSTF1 | F4 |
| 0F3 | 10 011110101 | 0315 | | BRNC | EXSIGN |
| 0F4 | 11 011111111 | 0316 | | CALL | EXC4 |
| 0F5 | 000110 1 1001 | 0317 | EXSIGN | MTOAC1 | 9 |
| 0F6 | 000111 1 1000 | 0318 | | EXAMC1 | 8 |
| 0F7 | 011111 1 1001 | 0319 | | ATOMC1 | 9 |
| 0F8 | 11 100010010 | 0320 | | CALL | EXBC |
| 0F9 | 0000101 1010 | 0321 | EXC2 | LKRA | 10 |
| 0FA | 001000 1 0001 | 0322 | | TSTF1 | F1 |
| 0FB | 10 111001100 | 0323 | | BRNC | CTOA |
| 0FC | 000110 1 1001 | 0324 | | MTOAC1 | 9 |
| 0FD | 0100010 1000 | 0325 | | AKAC | 8 |
| 0FE | 10 100000011 | 0326 | | BRNC | EXC3 |
| 0FF | 0000000 1000 | 0327 | EXC4 | LKAC | 8 |
| 100 | 010111 1 1000 | 0328 | | AMACC1 | 8 |
| 101 | 011111 1 1000 | 0329 | | ATOMD1 | 8 |
| 102 | 001011 00000 | 0330 | | RETN | |
| 103 | 001000 1 0100 | 0331 | EXC3 | TSTF1 | F3 |
| 104 | 10 101011001 | 0332 | | BRNC | MULTIPLY |
| 105 | 11 100010010 | 0333 | | CALL | EXBC |
| 106 | 0000101 1000 | 0334 | BZERO | LKRA | 8 |
| 107 | 000100 0 0000 | 0335 | BZERO1 | MTOAC | |
| 108 | 0110000 0000 | 0336 | | CKAC | 0 |
| 109 | 10 100010001 | 0337 | | BRNC | BNZERO |
| 10A | 0100111 0001 | 0338 | | AKRA | 1 |
| 10B | 0110100 1111 | 0339 | | CKRA | 15 |
| 10C | 10 100000111 | 0340 | | BRNC | BZERO1 |
| 10D | 001011 00000 | 0341 | | RETN | |
| 10E | 011111 1 1000 | 0342 | | ATOMC1 | 8 |
| 10F | 11 111001010 | 0343 | | CALL | MULT13 |
| 110 | 10 110110101 | 0344 | | BRNC | LOCKB |
| 111 | 001011 00000 | 0345 | BNZERO | RETN | |
| 112 | 0000101 0000 | 0346 | EXBC | LKRA | 0 |
| 113 | 000100 1 0000 | 0347 | EXBC1 | MTOA1 | |
| 114 | 0100111 1000 | 0348 | | AKRA | 8 |
| 115 | 000101 0 0000 | 0349 | | EXAMC | |
| 116 | 0100111 1000 | 0350 | | AKRA | 8 |
| 117 | 011101 1 0000 | 0351 | | ATCM1 | |
| 118 | 0100111 0001 | 0352 | | AKRA | 1 |
| 119 | 0110100 1000 | 0353 | | CKRA | 8 |
| 11A | 10 100010011 | 0354 | | BRNC | EXBC1 |
| 11B | 001011 00000 | 0355 | | RETN | |
| 11C | 11 010010110 | 0356 | | CALL | EXBA |
| 11D | 0000101 1000 | 0357 | SUBOPT | LKRA | 8 |

TABLE II—Continued

| | | | | | |
|---|---|---|---|---|---|
| 11E | 000110 1 0111 | 0358 | | MTOAD1 | 7 |
| 11F | 0100000 1111 | 0359 | | AKNC | 15 |
| 120 | 0100010 0001 | 0360 | | AKAC | 1 |
| 121 | 10 100111101 | 0361 | | BRNC | SUBDPT1 |
| 122 | 000110 0 0111 | 0362 | | MTOADO | 7 |
| 123 | 001011 00000 | 0363 | SUBDPT2 | RETN | |
| 124 | 011111 0 1111 | 0364 | | ATOMCO | 15 |
| 125 | 0000111 0000 | 0365 | A−C=A | LKAR | 0 |
| 126 | 010101 1 0000 | 0366 | ADD1 | AMAC1 | |
| 127 | 0100000 1111 | 0367 | | AKNC | 15 |
| 128 | 0100010 0001 | 0368 | | AKAC | 1 |
| 129 | 10 100101011 | 0369 | | BRNC | ADD2 |
| 12A | 10 100110011 | 037C | | BRNC | ADD4 | ALWAYS BRANCH |
| 12B | 010101 0 0000 | 0371 | ADD2 | AMACO | |
| 12C | 10 100110000 | 0372 | | BRNC | ADD3 |
| 12D | 011101 0 0000 | 0373 | | ATOMO | |
| 12E | 0000000 0000 | 0374 | | LKAC | 0 |
| 12F | 10 10011C011 | 0375 | | BRNC | ADD4 | ALWAYS BRANCH |
| 130 | 0100010 1010 | 0376 | ADD3 | AKAC | 10 |
| 131 | 011101 0 0000 | 0377 | | ATOMO | |
| 132 | 0000000 0001 | 0378 | | LKAC | 1 |
| 133 | 0100111 0001 | 0379 | ADD4 | AKRA | 1 |
| 134 | 0110100 0111 | 0380 | | CKRA | 7 |
| 135 | 10 100100110 | 0381 | | BRNC | ADD1 |
| 136 | 001011 00000 | 0382 | | RETN | |
| 137 | 0110000 0000 | 0383 | | CKAC | 0 |
| 138 | 10 101000000 | 0384 | | BRNC | DIV1 |
| 139 | 000110 0 1000 | 0385 | | MTOADO | 8 |
| 13A | 0100010 0001 | 0386 | | AKAC | 1 |
| 13B | 011111 0 1000 | 0387 | | ATOMCO | 8 |
| 13C | 10 100100101 | 0388 | | BRNC | A−C=A | ALWAYS BRANCH |
| 13D | 010111 0 0111 | 0389 | SUBDPT1 | AMACCO | 7 |
| 13E | 11 101010011 | 0390 | | CALL | TCGF3 |
| 13F | 10 100100011 | 0391 | | BRNC | SUBDPT2 | ALWAYS BRANCH |
| 140 | 000110 0 1101 | 0392 | DIV1 | MTOADO | 13 |
| 141 | 0110000 0000 | 0393 | | CKAC | 0 |
| 142 | 10 101111001 | 0394 | | BRNC | POSTNORM |
| 143 | 11 101100011 | 0395 | | CALL | A+C=A |
| 144 | 11 101000110 | 0396 | | CALL | SL |
| 145 | 11 010010110 | 0397 | | CALL | EXBA |
| 146 | 0000000 0000 | 0398 | SL | LKAC | 0 |
| 147 | 0000101 1000 | 0399 | SL1 | LKRA | 8 |
| 148 | 000101 0 0000 | 0400 | SL2 | EXAMO | |
| 149 | 0100111 0001 | 0401 | | AKRA | 1 |
| 14A | 0110100 1111 | 0402 | | CKRA | 15 |
| 14B | 10 101001000 | 0403 | | BRNC | SL2 |
| 14C | 001011 00000 | 0404 | | RETN | |
| 14D | 11 010010110 | 0405 | | CALL | EXBA |
| 14E | 000110 0 1111 | 0406 | | MTOACO | 15 |
| 14F | 0100010 0001 | 0407 | | AKAC | 1 |
| 150 | 10 101010111 | 0408 | | BRNC | DIV4 |
| 151 | 001000 1 0100 | 0409 | | TSTF1 | F3 |
| 152 | 10 110001110 | 0410 | | BRNC | UNDERFL |
| 153 | 000101 1 0000 | 0411 | TCGF3 | EXAM1 | |
| 154 | 0100000 0100 | 0412 | | AKNC | 4 |
| 155 | 000101 1 0000 | 0413 | | EXAM1 | |
| 156 | 001011 00000 | 0414 | | RETN | |
| 157 | 011111 0 1111 | 0415 | DIV4 | ATOMCO | 15 |
| 158 | 10 100100101 | 0416 | | BRNC | A−C=A | ALWAYS BRANCH |
| 159 | 000110 1 0111 | 0417 | MULTIPLY | MTOAC1 | 7 |
| 15A | 010111 0 1111 | 0418 | | AMACCO | 15 |
| 15B | 10 101011110 | 0419 | | BRNC | MUL3 |
| 15C | 0000101 1001 | 0420 | | LKRA | 9 |
| 15D | 11 101010011 | 0421 | | CALL | TCGF3 |
| 15E | 011111 0 0111 | 0422 | MUL3 | ATOMCO | 7 |
| 15F | 000110 0 1000 | 0423 | MUL4 | MTOACO | 8 |
| 160 | 0100010 1111 | 0424 | | AKAC | 15 |
| 161 | 10 101110101 | 0425 | | BRNC | MULT1 |
| 162 | 011111 0 1000 | 0426 | | ATOMCO | 8 |
| 163 | 0000111 0000 | 0427 | A+C=A | LKAR | 0 |
| 164 | 0101011 0000 | 0428 | ADD6 | AMAC1 | |
| 165 | 010101 0 0000 | 0429 | | AMACO | |
| 166 | 10 101101011 | 0430 | | BRNC | ADD7 |
| 167 | 0100010 0110 | 0431 | | AKAC | 6 |

TABLE II—Continued

| | | | | | |
|---|---|---|---|---|---|
| 168 | 011101 0 0000 | 0432 | | ATOMO | |
| 169 | 0000000 0001 | 0433 | | LKAC | 1 |
| 16A | 10 101110000 | 0434 | | BRNC | ADD10 ALWAYS BRANCH |
| 16B | 011101 0 0000 | 0435 | ADD7 | ATOMO | |
| 16C | C100010 0110 | 0436 | | AKAC | 6 |
| 16D | 10 101101111 | 0437 | | BRNC | ADD9 |
| 16E | 10 101101000 | 0438 | | BRNC | ADD8 ALWAYS BRANCH |
| 16F | 0000000 0000 | 0439 | ADD9 | LKAC | 0 |
| 170 | 0100111 0001 | 0440 | ADD10 | AKRA | 1 |
| 171 | C110100 0111 | 0441 | | CKRA | 7 |
| 172 | 10 101100100 | 0442 | | BRNC | ADD6 |
| 173 | 001011 00000 | 0443 | | RETN | |
| 174 | 10 101011111 | 0444 | | BRNC | MUL4 ALWAYS BRANCH |
| 175 | 11 100000110 | 0445 | MULT1 | CALL | BZERO |
| 176 | C110000 0000 | 0446 | | CKAC | 0 |
| 177 | 10 110110111 | 0447 | | BRNC | MULT10 |
| 178 | 11 010010110 | 0448 | PPOST | CALL | EXBA |
| 179 | C000101 1110 | 0449 | PCSTNORM | LKRA | 14 |
| 17A | C01000 0 1111 | 045C | | MNECO | |
| 17B | 10 110000011 | 0451 | | BRNC | PNORM1 |
| 17C | 11 110111001 | 0452 | | CALL | SR |
| 17D | 000110 0 1111 | 0453 | | MTOACO | 15 |
| 17E | C100010 1111 | 0454 | | AKAC | 15 |
| 17F | C11111 0 1111 | 0455 | | ATOMCO | 15 |
| 180 | C110000 1111 | 0456 | | CKAC | 15 |
| 181 | 10 110000011 | 0457 | | BRNC | PNORM1 |
| 182 | 11 111001010 | 0458 | | CALL | MULT13 |
| 183 | C000101 1000 | 0459 | PNORM1 | LKRA | 8 |
| 184 | C01000 1 0100 | 046C | | TSTF1 | F3 |
| 185 | 1C 110001010 | 0461 | | BRNC | POSTN |
| 186 | 000110 0 1111 | 0462 | | MTOACO | 15 |
| 187 | C100010 0110 | 0463 | | AKAC | 6 |
| 188 | C11111 0 1111 | 0464 | | ATOMDO | 15 |
| 189 | 10 000001111 | 0465 | | BRNC | LOCK ALWAYS BRANCH |
| 18A | CC00101 1001 | 0466 | PCSTN | LKRA | 9 |
| 18B | C01000 1 0100 | 0467 | | TSTF1 | F3 |
| 18C | 10 110001111 | 0468 | | BRNC | PNORM2 |
| 18D | 11 101010011 | 0469 | | CALL | TCGF3 |
| 18E | 11 000000100 | 047C | UNDERFL | CALL | PUP |
| 18F | 000110 0 1111 | 0471 | PNORM2 | MTOACO | 15 |
| 190 | C100010 1010 | 0472 | | AKAC | 10 |
| 191 | 10 110010110 | 0473 | | BRNC | PNORM3 |
| 192 | C100010 0101 | 0474 | PNORM6 | AKAC | 5 |
| 193 | 011111 0 1111 | 0475 | | ATOMDO | 15 |
| 194 | 11 110111001 | 0476 | | CALL | SR |
| 195 | 10 110001111 | 0477 | | BRNC | PNORM2 ALWAYS BRANCH |
| 196 | C110000 1010 | 0478 | PNORM3 | CKAC | 10 |
| 197 | 10 110011001 | 0479 | | BRNC | PNORM4 |
| 198 | 10 110011100 | 048C | | BRNC | PNORM5 ALWAYS BRANCH |
| 199 | 0000101 1000 | 0481 | PNORM4 | LKRA | 8 |
| 19A | C01000 0 1111 | 0482 | | MNEOC | |
| 19B | 10 110010010 | 0483 | | BRNC | PNORM6 |
| 19C | 11 100000110 | 0484 | PNORM5 | CALL | BZERO |
| 19D | C110000 0000 | 0485 | | CKAC | 0 |
| 19E | 10 110100000 | 0486 | | BRNC | PNORM7 |
| 19F | 011111 1 1000 | 0487 | | ATOMC1 | 8 |
| 1AC | 0000000 0000 | 0488 | PNORM7 | LKAC | 0 |
| 1A1 | 000111 1 1011 | 0489 | | EXAMD1 | 11 |
| 1A2 | C110000 C000 | 049C | | CKAC | 0 |
| 1A3 | 10 11C101C00 | 0491 | | BRNC | FUNCKEY |
| 1A4 | 0000101 1001 | 0492 | | LKRA | 9 |
| 1A5 | C01000 1 0010 | 0493 | | TSTF1 | F2 |
| 1A6 | 11 110110001 | 0494 | | CALL | TCGF2 |
| 1A7 | 10 000001100 | 0495 | | BRNC | LOCK1 |
| 1A8 | 011111 1 1010 | 0496 | FUNCKEY | ATOMC1 | 10 |
| 1A9 | 11 100010010 | 0497 | | CALL | EXBC |
| 1AA | 11 000000100 | 0498 | | CALL | PUP |
| 1AB | 11 111001100 | 0499 | | CALL | CTOA |
| 1AC | 000110 1 1000 | 050C | | MTOAC1 | 8 |
| 1AD | 011111 1 1001 | 0501 | | ATOMC1 | 9 |
| 1AE | 0000101 1001 | 0502 | | LKRA | 9 |
| 1AF | 001000 1 0010 | 0503 | | TSTF1 | F2 |

TABLE II—Continued

| | | | | | | |
|---|---|---|---|---|---|---|
| 1B0 | 10 11011C101 | 0504 | | BRNC | LOCKB | |
| 1B1 | C00101 1 0000 | 0505 | TCGF2 | EXAM1 | | |
| 1B2 | C100000 0010 | 05C6 | | AKNC | 2 | |
| 1B3 | C00101 1 0000 | 0507 | | EXAM1 | | |
| 1B4 | 001011 00000 | 0508 | | RETN | | |
| 1B5 | 11 010010110 | 0509 | LOCKB | CALL | EXBA | |
| 1B6 | 10 000001100 | 0510 | | BRNC | LOCK1 | ALWAYS BRANCH |
| 1B7 | 11 110111001 | 0511 | MULT10 | CALL | SR | |
| 1B8 | 11 010010110 | 0512 | | CALL | EXBA | |
| 1B9 | C000000 C000 | 0513 | SR | LKAC | 0 | |
| 1BA | 0000101 1110 | 0514 | | LKRA | 14 | |
| 1BB | C00101 0 0000 | 0515 | SR1 | EXAMC | | |
| 1BC | 0100111 1111 | 0516 | | AKRA | 15 | |
| 1BD | C110100 0111 | 0517 | | CKRA | 7 | |
| 1BE | 10 110111011 | 0518 | | BRNC | SR1 | |
| 1BF | 001011 00000 | 0519 | | RETN | | |
| 1C0 | 11 010010110 | 0520 | | CALL | EXBA | |
| 1C1 | 000110 0 0111 | 0521 | SUB1OPT | MTOAD0 | 7 | |
| 1C2 | C100010 1111 | 0522 | | AKAC | 15 | |
| 1C3 | 10 111000101 | 0523 | | BRNC | MULT11 | |
| 1C4 | 10 101011110 | 0524 | | BRNC | MUL3 | ALWAYS BRANCH |
| 1C5 | 0000101 1001 | 0525 | MULT11 | LKRA | 9 | |
| 1C6 | CC1000 1 0100 | 0526 | | TSTF1 | F3 | |
| 1C7 | 10 111001010 | 0527 | | BRNC | MULT13 | |
| 1C8 | 11 101010011 | 0528 | MULT12 | CALL | TCGF3 | |
| 1C9 | 10 101011110 | 0529 | | BRNC | MUL3 | ALWAYS BRANCH |
| 1CA | 0000101 1000 | 0530 | MULT13 | LKRA | 8 | |
| 1CB | 10 111001000 | 0531 | | BRNC | MULT12 | ALWAYS BRANCH |
| 1CC | 000110 1 0111 | 0532 | CTOA | MTCAD1 | 7 | |
| 1CD | 011111 0 0111 | 0533 | | ATUMC0 | 7 | |
| 1CE | 11 101100C11 | 0534 | | CALL | A+C=A | |
| 1CF | 000110 1 1001 | 0535 | | MTOAC1 | 9 | |
| 1D0 | 011111 1 0110 | 0536 | | ATOMC1 | 6 | |
| 1D1 | 11 100010010 | 0537 | PLMI1 | CALL | EXBC | |
| 1D2 | 11 100011101 | 0538 | PLMI2 | CALL | SUBOPT | |
| 1D3 | C01000 1 0100 | 0539 | | TSTF1 | F3 | |
| 1D4 | 10 111011111 | 0540 | | BRNC | PLMI3 | |
| 1D5 | 11 101010C11 | 0541 | | CALL | TCGF3 | |
| 1D6 | 11 011110101 | 0542 | | CALL | EXSIGN | |
| 1D7 | 11 010010110 | 0543 | | CALL | EXBA | |
| 1D8 | 10 111010001 | 0544 | | BRNC | PLMI1 | ALWAYS BRANCH |
| 1D9 | 11 010010110 | 0545 | PLMI4 | CALL | EXBA | |
| 1DA | 11 110111001 | 0546 | | CALL | SR | |
| 1DB | 11 010010110 | 0547 | | CALL | EXBA | |
| 1DC | 0100010 1111 | 0548 | | AKAC | 15 | |
| 1DD | 011111 0 0111 | 0549 | | ATOMC0 | 7 | |
| 1DE | 10 111010010 | 0550 | | BRNC | PLMI2 | ALWAYS BRANCH |
| 1DF | C110000 0000 | 0551 | PLMI3 | CKAC | 0 | |
| 1E0 | 10 111011001 | 0552 | | BRNC | PLMI4 | |
| 1E1 | 000110 1 1000 | 0553 | | MTOAC1 | 8 | |
| 1E2 | 010111 1 1001 | 0554 | | AMACC1 | 9 | |
| 1E3 | 10 111100110 | 0555 | | BRNC | PLMI5 | |
| 1E4 | 11 10110C011 | 0556 | PLMI6 | CALL | A+C=A | |
| 1E5 | 10 111101101 | 0557 | | BRNC | PLMI8 | ALWAYS BRANCH |
| 1E6 | C100010 1000 | 0558 | PLMI5 | AKAC | 8 | |
| 1E7 | 10 111100100 | 0559 | | BRNC | PLMI6 | |
| 1E8 | 11 011110101 | 0560 | PLMI7 | CALL | EXSIGN | |
| 1E9 | 11 100010010 | 0561 | | CALL | EXBC | |
| 1EA | 11 100100101 | 0562 | | CALL | A-C=A | |
| 1EB | C110000 0C00 | 0563 | | CKAC | 0 | |
| 1EC | 10 111111C10 | 0564 | | BRNC | PLMI9 | |
| 1ED | 11 100010010 | 0565 | PLMI8 | CALL | EXBC | |
| 1EE | C000000 0000 | 0566 | | LKAC | 0 | |
| 1EF | C00111 1 0110 | 0567 | | EXAMC1 | 6 | |
| 1F0 | 011111 1 1001 | 0568 | | ATOMD1 | 9 | |
| 1F1 | 10 101111000 | 0569 | | BRNC | PPOST | ALWAYS BRANCH |
| 1F2 | 11 101100011 | 0570 | PLMI9 | CALL | A+C=A | |
| 1F3 | 11 010010110 | 0571 | | CALL | EXBA | |
| 1F4 | 11 100010010 | 0572 | | CALL | EXBC | |
| 1F5 | 11 010010110 | 0573 | | CALL | EXBA | |
| 1F6 | 10 111101000 | 0574 | | BRNC | PLMI7 | ALWAYS BRANCH |

A calculator system embodying the present invention has now been described in detail. It is anticipated that various modifications may be made to the described system such as increasing its bit capacity, modifying, increasing, or decreasing the instruction set given by way of example in Table I in order to perform other functions and/or modifying, increasing or decreasing the specific program steps stored in ROM 20A as given by way of example in Table II in order to cause the system to operate in a different manner.

In addition, the preferred embodiment has been described as utilizing I²L circuitry; however, it is contemplated that one of ordinary skill in the art could easily fabricate the same circuitry utilizing other bipolar technology, metal insulator semiconductor technology, CMOS technologyy, etc.

Since it is obvious that many additional changes and modifications can be made in the above described details without departing from the nature and spirit of the invention, it is understood that the invention is not to be limited to said details except as set forth in the appended claims.

What is Claimed is:

1. In an electronic calculator system having an addressable data storage means, an arithmetic unit for performing operations on data and control circuitry for providing commands which define the operation of the system, an output circuit comprising:
   a. a first multi-function register means coupled to the output of said arithmetic unit for providing first coded output signals in a first coded format and addresses of said data storage means;
   b. a second multi-function register means for providing second coded output signals in a second coded format and data;
   c. output means having first and second sets of terminals;
   d. first decoder means coupled to said output means for decoding said first coded output signals from said first coded format to a third coded format for output to said first set of terminals;
   e. second decoder means coupled to said output means for decoding said second coded output signals from said second coded format to a fourth coded format for output to said second set of terminals;
   f. a first set of latches coupling said first register means to said first decoder means for latching said first coded output signals in said first coded format; and
   g. a second set of latches coupling said second register means to said second decoder means for latching said second coded output signals in said second coded format; wherein
   h. said first and second register means are adapted to provide addresses and data, respectively, while output signals are simultaneously provided by said latches through said decoders to said first and second sets of terminals.

2. The output circuit according to claim 1 wherein said first coded format is binary.

3. The output circuit according to claim 1 wherein said second coded format is binary.

4. The output circuit according to claim 1 wherein said third coded format is one of $n$ for $n$ terminals in said first set.

5. The output circuit according to claim 4 wherein each of said $n$ terminals is coupled to a display digit which is selected in accordance with said first coded output signal as decoded by said first decoder means.

6. The output circuit according to claim 1 wherein said fourth coded format is segment 7.

7. The output circuit according to claim 1 wherein said control circuitry is arranged to cause said arithmetic unit to periodically increment said first register means wherein said first decoder means is adapted to actuate first set of terminals in sequential order.

8. The output circuit according to claim 1 wherein the data storage means, the arithmetic unit, and the first and second multi-function registers are all of four bit parallel format, and both the first and second sets of terminals are of greater number than four.

9. In an electronic calculator system having an addressable data storage means, an arithmetic unit for performing operations on data and control circuitry for providing commands which define the operation of the system, an output circuit comprising:
   a. a first multi-function register coupled to the output of said arithmetic unit for providing binary output signals and binary addresses of said data storage means;
   b. a second multi-function register coupled to the output of said arithmetic unit for providing second binary output signals and binary data;
   c. output means having a first set of $n$ terminals corresponding to $n$ digit positions and a second set of $m$ terminals corresponding to $m$ segments;
   d. first decoder means coupled to said digit terminals for decoding said first output signals from binary format to one of $n$ format for selection of corresponding ones of said $n$ digit positions;
   e. second decoder means coupled to the segment terminals of said output means for decoding said second output signal from binary format to $m$ segment format indicative of particular digits to be displayed at selected digit positions;
   f. a first set of latches coupling said first register to said first decoder means for latching said first output signals in binary format; and
   g. a second set of latches coupling said second register to said second decoder means for latching said second output signal in binary format; wherein
   h. said first and second registers are adapted to provide addresses and data, respectively, while output data is simultaneously provided by means of said latches through said decoders to said first and second sets of terminals.

10. The output circuit according to claim 9 wherein the data storage means, the arithmetic unit, and the first and second multi-function registers are all of four bit parallel format, and both the first and second sets of terminals are of greater number than four.

11. An electronic calculator comprising:
   a. a keyboard for inputting numeric and function data;
   b. a display having a plurality of digits for displaying data;
   c. an addressable data storage means for storing data;
   d. an arithmetic unit for performing operations on data;
   e. control circuitry including an instruction storage means for providing commands which define the operation of the system responsive to the numeric and function data received from said keyboard;
   f. an address register means coupled to the output of said arithmetic unit for storing in binary format addresses of said data storage means and output signals indicative of selections of particular ones of said plurality of digits as computed in said arithmetic unit;

g. an accumulator register means for storing in binary form data including output data defining particular numbers to be displayed in digits selected by said output signals;

h. a first set of latches coupled to said address register means for storing said selections in binary format;

i. a second set of latches coupled to said accumulator register means for storing said output data in binary format; and j. logic means coupled to said control circuitry for enabling said first and second sets of latches to store said output signals in response to periodic load output instructions wherein said address and accumulator register means are adapted to provide addresses and data, respectively, while output data is simultaneously displayed by said display.

* * * * *